United States Patent
Halpert et al.

(10) Patent No.: US 6,963,930 B2
(45) Date of Patent: Nov. 8, 2005

(54) AUTOMATIC TRANSFER AND EXPANSION OF APPLICATION-SPECIFIC DATA FOR DISPLAY AT A WEBSITE

(75) Inventors: David Halpert, West Windsor, VT (US); Paul Ames, Lebanon, NH (US); Mario Ambrosi, Plainfield, NH (US); Stephen Smith, Lebanon, NH (US)

(73) Assignee: Centric Software, Inc., San Jose, CA (US)

( * ) Notice: Subject to any disclaimer, the term of this patent is extended or adjusted under 35 U.S.C. 154(b) by 907 days.

(21) Appl. No.: 09/784,495

(22) Filed: Feb. 15, 2001

(65) Prior Publication Data

US 2004/0225958 A1 Nov. 11, 2004

(51) Int. Cl.[7] ............................................. G06F 15/16
(52) U.S. Cl. ........................ 709/246; 715/523; 717/100
(58) Field of Search ................................ 709/205, 246, 709/219, 203, 217; 715/513, 523, 964, 751; 700/97, 182; 717/100, 148; 707/102

(56) References Cited

U.S. PATENT DOCUMENTS

| | | | |
|---|---|---|---|
| 5,220,657 A | | 6/1993 | Bly et al. |
| 5,530,852 A | | 6/1996 | Meske, Jr. et al. |
| 5,664,180 A | | 9/1997 | Halpert et al. |
| 5,708,806 A | | 1/1998 | DeRose et al. |
| 5,754,774 A | * | 5/1998 | Bittinger et al. ............ 709/203 |
| 5,835,898 A | | 11/1998 | Borg et al. |
| 5,890,131 A | * | 3/1999 | Ebert et al. ..................... 705/7 |
| 5,897,633 A | * | 4/1999 | Nolan ............................ 707/6 |
| 5,911,145 A | | 6/1999 | Arora et al. |
| 5,933,841 A | | 8/1999 | Schumacher et al. |
| 5,953,525 A | | 9/1999 | Glaser et al. |
| 5,973,695 A | | 10/1999 | Walsh et al. |
| 6,003,046 A | | 12/1999 | Nielsen |
| 6,052,531 A | | 4/2000 | Waldin, Jr. et al. |
| 6,073,144 A | | 6/2000 | vanHoff |
| 6,085,196 A | | 7/2000 | Motoyama et al. |
| 6,088,717 A | | 7/2000 | Reed et al. |
| 6,092,074 A | | 7/2000 | Rodkin et al. |
| 6,094,649 A | | 7/2000 | Bowen et al. |
| 6,105,044 A | | 8/2000 | DeRose et al. |
| 6,128,611 A | | 10/2000 | Doan et al. |
| 6,128,619 A | | 10/2000 | Fogarasi et al. |
| 6,144,962 A | | 11/2000 | Weinberg et al. |
| 6,160,552 A | | 12/2000 | Wilsher et al. |
| 6,170,081 B1 | | 1/2001 | Fontana et al. |
| 6,182,095 B1 | | 1/2001 | Leymaster et al. |
| 6,295,513 B1 | * | 9/2001 | Thackston ...................... 703/1 |
| 6,334,158 B1 | * | 12/2001 | Jennyc et al. ................ 719/328 |
| 6,562,076 B2 | * | 5/2003 | Edwards et al. ............ 715/515 |
| 6,571,292 B1 | * | 5/2003 | Fletcher ...................... 709/231 |
| 6,686,914 B2 | * | 2/2004 | Keener ........................ 345/420 |
| 6,718,218 B1 | * | 4/2004 | Matheson ..................... 700/95 |
| 6,741,265 B2 | * | 5/2004 | Ghosh et al. ................ 715/751 |
| 6,742,181 B1 | * | 5/2004 | Koike et al. ................. 719/317 |
| 6,766,361 B1 | * | 7/2004 | Venigalla ..................... 709/217 |
| 6,873,997 B1 | * | 3/2005 | Maijasie et al. .......... 707/104.1 |
| 2002/0035450 A1 | * | 3/2002 | Thackston ....................... 703/1 |

* cited by examiner

*Primary Examiner*—Abdullahi E. Salad
(74) *Attorney, Agent, or Firm*—Beyer Weaver & Thomas LLP

(57) ABSTRACT

Disclosed are methods, systems and computer software products for publishing, or displaying, structured data at a website, such that information structures specified by application-specific data generated at a client can be transferred to a server to be automatically expanded into corresponding information structures displayable by a website. Thus, for example, a user may produce a structured document using a program such as Microsoft Project, and wish to have it displayed at a website for display to other members of a work group. According to the present invention, the user executes a web browser, accesses the system's webpage, and drags and drops an icon representing the application-specific structured data onto an Inbox Control displayed on the website. The system of the present invention converts the application-specific data into source-independent data and transfers the data to the server. The server, in accordance with the received source-independent data, either creates or modifies information structures corresponding to the information structures specified by the application-generated structured data for display at the web site.

94 Claims, 14 Drawing Sheets

```xml
<?xml version="1.0"?>
<!--Assembly Publishing XML-->

<TARGETFACE ID="1" NAME="Sliding Assembly" DESCRIPTION="SolidWorks
Assembly" NAVIGATIONMODE="2" SPECIALTYPE="4"><INFOITEM NAME="Sliding
Assembly Bundle" DESCRIPTION="SolidWorks Assembly" DOCTYPE="3" TYPE="1"
SOURCEREF="C:\Program Files\SolidWorks98plus\SAMPLES\EXAMPLES\Dial
Caliper\Sliding Assembly.SLDASM" MASTERFILENAME="Sliding
Assembly.SLDASM">
<CUSTOMPROP NAME="XMLRef" VALUE="Sliding Assembly" DESCRIPTION="Unique name for
republishing" TYPE="4"/>

<DEPENDENCY FILENAME="D:\Program Files\SolidWorks98plus\samples\examples\Dial
Caliper\Depth Bar.SLDPRT"/>

<DEPENDENCY FILENAME="D:\Program Files\SolidWorks98plus\samples\examples\Dial
Caliper\Face Plate.SLDPRT"/>

<DEPENDENCY FILENAME="D:\Program Files\SolidWorks98plus\samples\examples\Dial
Caliper\Dial Lock Clamp.SLDPRT"/>
</INFOITEM>

<CUSTOMPROP NAME="XMLRef" VALUE="Sliding Assembly" DESCRIPTION="Unique name for
republishing" TYPE="4"/>

<LOOKGRAPHIC FILENAME="Sliding Assembly.SLDASM" ORIGINALREF="C:\Program
Files\SolidWorks98plus\SAMPLES\EXAMPLES\Dial Caliper\Sliding Assembly.SLDASM"/>

<FACE ID="2" NAME="Depth Bar" DESCRIPTION="SolidWorks Part"
                NAVIGATIONMODE="1" SPECIALTYPE="1">

<INFOITEM NAME="Depth Bar:SLDPRT" DESCRIPTION="SolidWorks Part" DOCTYPE="2"
TYPE="1" SOURCEREF="D:\Program Files\SolidWorks98plus\samples\examples\Dial
Caliper\Depth Bar.SLDPRT" MASTERFILENAME="Depth Bar.SLDPRT">

<CUSTOMPROP NAME="XMLRef" VALUE="Depth Bar" DESCRIPTION="Unique name for
republishing" TYPE="4"/>

</INFOITEM>

<CUSTOMPROP NAME="XMLRef" VALUE="Depth Bar" DESCRIPTION="Unique name for
republishing" TYPE="4"/>
<LOOKGRAPHIC FILENAME="Depth Bar.SLDPRT" ORIGINALREF="D:\Program
Files\SolidWorks98plus\samples\examples\Dial Caliper\Depth Bar.SLDPRT"/>

</FACE>

<FACE ID="3" NAME="Face Plate" DESCRIPTION="SolidWorks Part" NAVIGATIONMODE="1"
SPECIALTYPE="1">

<INFOITEM NAME="Face Plate:SLDPRT" DESCRIPTION="SolidWorks Part" DOCTYPE="2"
TYPE="1" SOURCEREF="D:\Program Files\SolidWorks98plus\samples\examples\Dial
Caliper\Face Plate.SLDPRT" MASTERFILENAME="Face Plate.SLDPRT">

<CUSTOMPROP NAME="XMLRef" VALUE="Face Plate" DESCRIPTION="Unique name for
republishing" TYPE="4"/>
```

FIG. 3

AUTOMATIC TRANSFER AND EXPANSION OF APPLICATION-SPECIFIC DATA FOR DISPLAY AT A WEBSITE

BACKGROUND OF THE INVENTION

1. Field of the Invention

The present invention relates generally to the website display of structured data. More particularly, the invention relates to a system that can automatically transfer and expand application-specific structured data, that can be obtained from a variety of applications, for display at a website.

2. Background of the Invention

In programming, manufacturing, processing, and other complex development systems, software tools have been developed to efficiently use the resources of the environment to minimize costs and increase efficiency. Design team members often use computerized tools to assist them when developing a complex system. A team member may develop a plan, drawing, schedule or other representation of the system. However, it is difficult to publish the representation to other team members while maintaining the ability to modify it.

In addition, there are many applications for many different types of data. For example, mechanical engineers on a design teams may use three-dimensional CAD systems to develop floor plans that position components of the system on a shop floor or in another appropriate environment to provide easy access and optimize use of available space. Process engineers use process modeling software tools to generate a computerized representation of the system environment to design processes that use raw materials efficiently and eliminate significant bottlenecks. Electrical engineers use software applications to develop electrical plans that ensure, among other things, that the articles in the environment have access to appropriate electrical inputs. Software development teams use project task applications to specify task interrelationships and start and end dates. Technical writers use as technical documentation software to access and modify technical documents having chapters, sections, and subsections, and associated tables-of-contents, which must be updated and modified as the document is revised.

Many other data files have embedded information that describes something about the organization and hierarchical decomposition of the design or information of the data. Many kinds of three-dimensional CAD data, such as in files created by CAD tools such as Solidworks or ProEngineer, contain structured data that can be recognized and used by other applications. This type of software is used to organize and display a three-dimensional design into assemblies, sub-assemblies and parts.

Another example of structured data is the case of a project schedule produced by an application like Microsoft Project file. In this case, the structured data that can be recognized includes the tasks and sub-tasks of the schedule.

Structured data can also be recognized in many kinds of drawing programs, such as Visio. Visio allows creation of diagrams such as organizational charts or network diagrams where the structure that is recognized includes pages and objects on the page. In the case of an organizational chart, the structure may be the departments and the employee reporting structure within each department. In the case of a network diagram, it may be the organization and relationships of the various networked PCs, printers and file servers.

Many other types of data, such as that produced by Microsoft PowerPoint outlines, Microsoft Excel spreadsheets, and Bill of Material database reports have data that has categories of information and an implied organizational 'outline' or hierarchy.

While much time is taken to create these types of application-specific structured data and hierarchical data charts and drawings, it is difficult to share the data with the members of a group who are involved with the plans, specifications, schedules or drawings. Frequently, a drawing, chart or schedule will be produced and distributed, and will then need to be updated. Using present systems, it is difficult to control distribution of modifications to the structures and ensure that all who would be affected by the change are timely notified. It is also difficult to maintain original data when making changes to certain data elements.

Systems have been developed that allow software development tools to be used in different environments. Thus, for example, U.S. Pat. No. 6,170,081 discloses a system that creates a context object to store intermediate information that is generated while the tool is being used. Information about the environment in which the tool is going to be used is identified and stored in the context object. A native UML model is extracted from a storage device and is converted to an XML file for input to the software development tool. The XML file can then be extracted and converted back to the native UML software model.

U.S. Pat. No. 6,003,046 shows a system for on-line browsing of structured documents. The system retrieves a selected page of a structured document, automatically develops context information about the selected page, and then inserts the context information into a webpage. The modified webpage is then sent to a remote location for display. Using the system, a hierarchically-structured document, such as technical documentation with chapters, sections, and subsections, is displayed along with the user's current position in the document using a detailed table-of contents showing the structure of the document. A website stores the structured document, and when a user requests a page of the structured document, the system concatenates the HTML source for that page with a fisheye view of the table-of-contents. Other systems are described in the following U.S. patents:

U.S. Pat. No. 6,182,095
U.S. Pat. No. 6,182,092
U.S. Pat. No. 6,160,552
U.S. Pat. No. 6,144,962
U.S. Pat. No. 6,128,619
U.S. Pat. No. 6,128,611
U.S. Pat. No. 6,105,044
U.S. Pat. No. 6,094,649
U.S. Pat. No. 6,092,074
U.S. Pat. No. 6,088,717
U.S. Pat. No. 6,085,196
U.S. Pat. No. 6,073,144
U.S. Pat. No. 6,052,531
U.S. Pat. No. 5,973,695
U.S. Pat. No. 5,953,525
U.S. Pat. No. 5,933,841
U.S. Pat. No. 5,911,145
U.S. Pat. No. 5,835,898
U.S. Pat. No. 5,708,806

U.S. Pat. No. 5,530,852

U.S. Pat. No. 5,220,657

However, systems typical of the prior art, such as those described in the above-referenced patents, do not provide a system that publishes, on a website, application-specific, hierarchical data that has been obtained from any of a number of application programs. In addition, none of the prior art systems enables a simple way for a user to modify objects in an original set of application-specific data and have that data appropriately modified and displayed on the website.

Accordingly, a need exists for a software application that can publish hierarchical data that has been obtained from any of a number of applications and have the ability to update that data.

It is therefore an object of the present invention to provide a system that allows a user to publish, at a website, application-specific hierarchical data that can be produced from a variety of applications.

It is a further object of the invention to provide a system allows users to drag and drop any document or file containing structured data onto a Inbox control on a website and have that structure expanded into a matching structure on the website.

It is yet another object of the invention to enable the user to modify objects in the original structure and have the data that is associated with that object on the website appropriately modified.

It is another object of the invention to automatically notify users by e-mail when a data-object and is revised and the revision is republished on the website.

It is an additional object of the invention to allow data modules to interpret new kinds of application-specific data to be easily integrated into the system.

SUMMARY OF THE INVENTION

These and other objects are attained by the invention, which comprises methods, systems and computer software products for automatically transferring and expanding application-specific data for display at a website.

According to one aspect of the present invention, the user can execute a web browser, access the server's webpage, and drag and drop an icon representing the application-specific structured data onto a displayed "Inbox Control" area (or use an equivalent designation technique, such as browsing a file list and highlighting a file name). The system of the present invention then passes the designated application-specific data to a Data Selector module that determines: 1) the characteristics of the application-specific data; and 2) the identities of various registered Data Clients to process the data. The Data Selector then passes the application-specific data and the data characteristics to the registered Data Clients. The Data Clients produce bids representing their ability to process the application-specific data, and the Data Selector selects one of the Data Clients to process the data. The selected Data Client converts the application-specific data into source-independent data and transfers the data to the server. The server, in accordance with the received source-independent data, either creates or modifies information structures corresponding to the information structures specified by the application-generated structured data for display at the web site, allowing other users to view the application-specific structured data.

Thus, for example, when a user produces application-specific structured data using a program such as Microsoft Project, in accordance with the invention, the data can be transferred to the system's website for display to multiple users. When the original data is modified, the website is modified accordingly, and notification is sent to the interested users.

Those skilled in the art will appreciate that the methods, systems and software products described herein can be implemented in systems and software other than the specific examples set forth herein, and such examples are provided by way of illustration rather than limitation. In particular, numerous equivalent architectures and configurations of servers, clients, system processing modules, application-specific data and network configurations can be constructed and supported in accordance with the following description.

This specification, including the drawings attached hereto, will next present the invention at various levels of enabling detail, from conceptual to specific examples of implementation.

BRIEF DESCRIPTION OF THE DRAWINGS

FIG. 3 is a sample of XML code as would be produced according to the present invention.

DETAILED DESCRIPTION OF THE INVENTION

Structured data publishing according to the present invention allows users to transfer to a web server (using "drag and drop" or an equivalent GUI method) any document or file containing structured data, such that a structure defined by the data can be "expanded" into a matching structure on a corresponding website. Although the following description is directed towards the publishing, or display, on a website, of structured data, the system of the present invention is equally applicable for the web publishing of non-structured data, or non-hierarchical data. Structure is described in generic way, using Extensible Markup Language (XML), and is used on the server to create the structure of the website.

Figure 1:
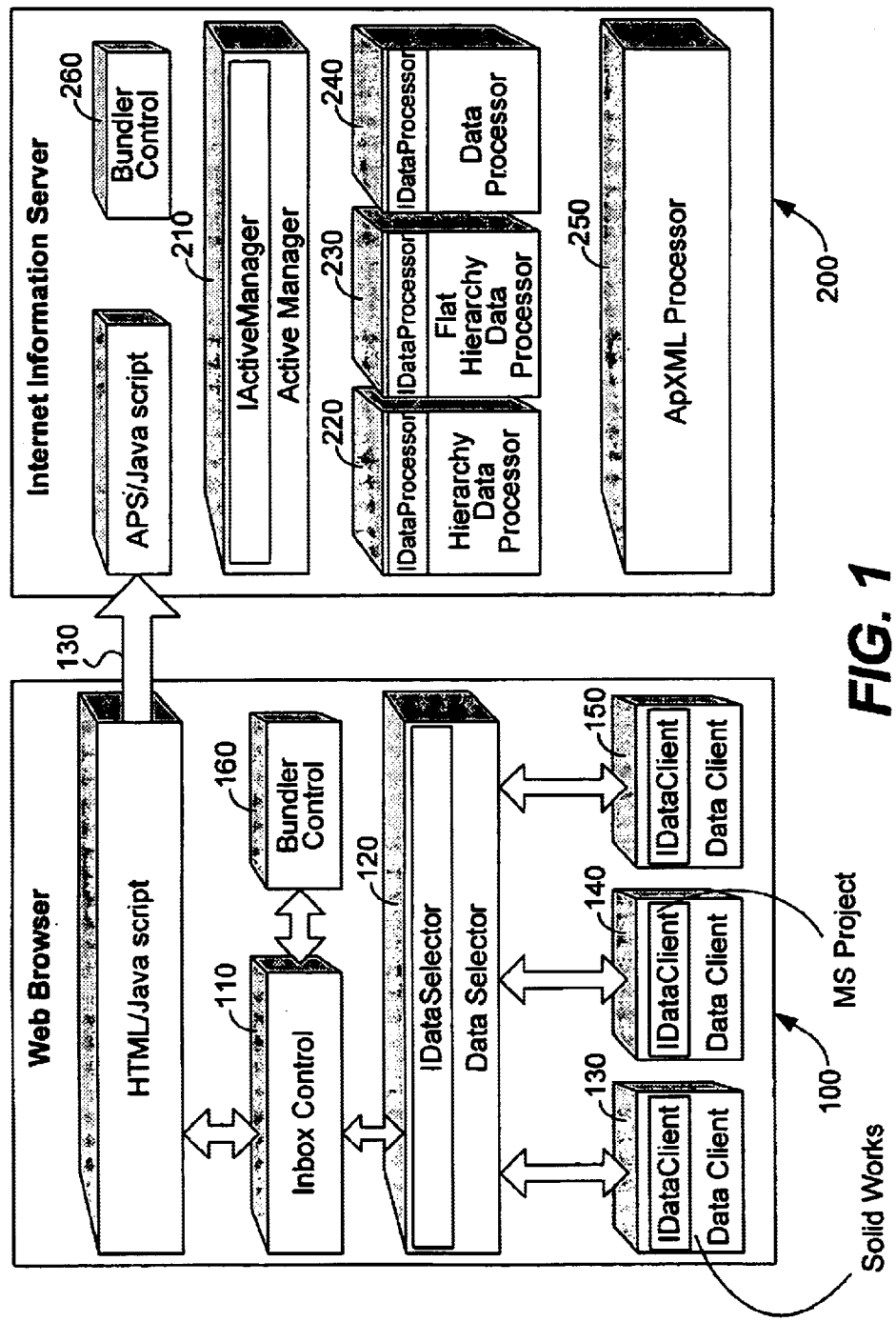
FIG. 1 shows the major components of the structured data publishing system of the present invention.

FIG. 1 depicts the interaction of all of the major components involved in the structured data publishing system of the present invention. Client system 100 is connected to server computer 200 over a network connection such as the Internet 300. A user operating an applications program at the client generates application-specific data at the client 100, and would like to have it displayed, or published, by server 200.

The main components on Client 100 are the Inbox Control 110, the Data Selector 120, the Data Clients 130, 140, 150, and the Bundler Control 160. Although the configuration in FIG. 1 shows three Data Clients, any number of Data Clients may be on a particular Client. The main components on Server 200 are the Active Manager 210, Data Processors 220, 230, 240, the ApXML Processor 250, and the Bundler Control 260.

Figure 2A:
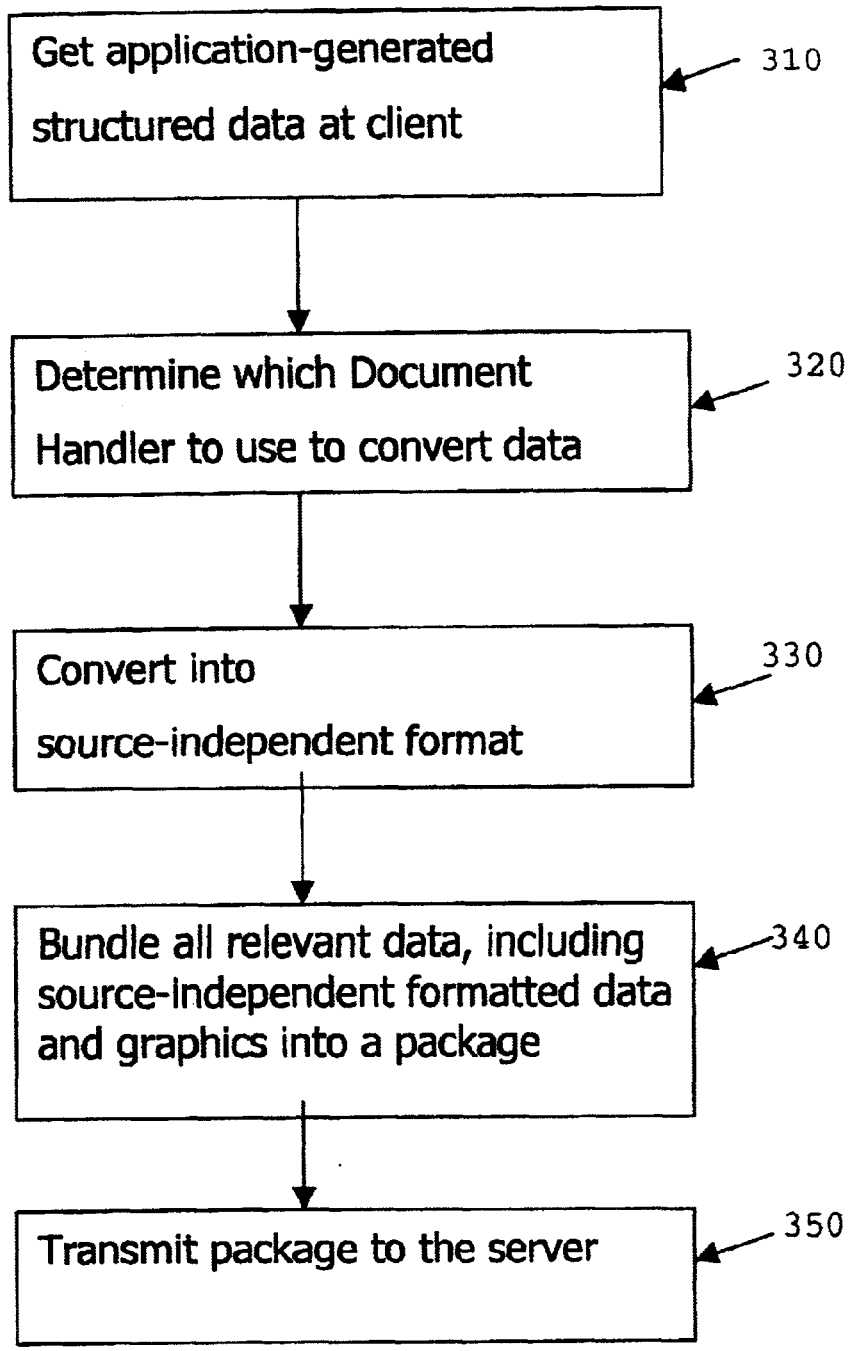
FIG. 2A is a flowchart of the processes in the Client computer.
Figure 2B:
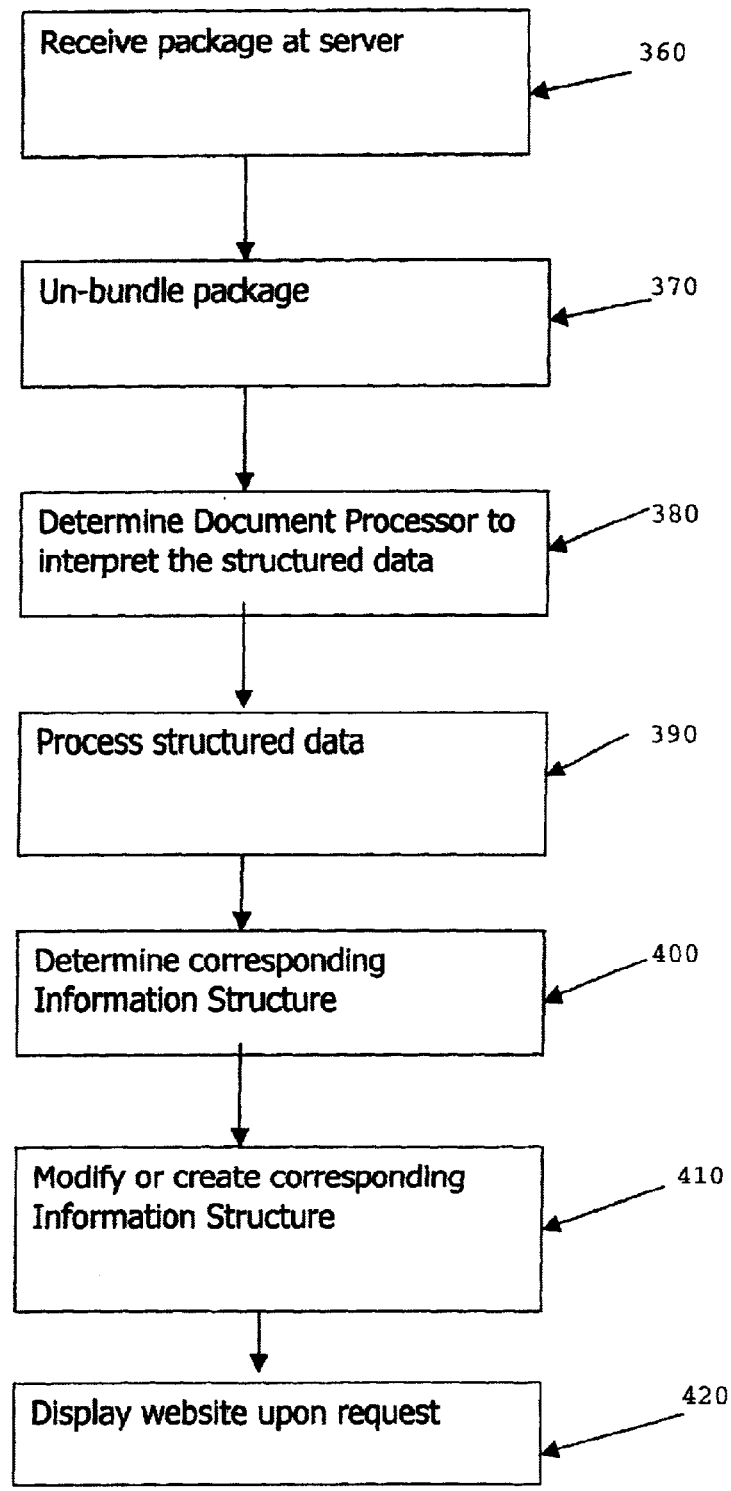
FIG. 2B is a flowchart of the processes in the Server computer.

Referring to FIGS. 2A and 2B, a flow charts are shown that will be used to describe the structured data publishing system of the present invention in conjunction with FIG. 1.

As shown at 310 in FIG. 2A, after producing application-specific structured data at a client, the user executes a browser program at the server and navigates in the web browser to the system web page from the server that has an "Inbox Control" icon. The "Inbox Control" is an ActiveX control that functions as a "drop" target in a Graphical User Interface image presented by the website to the user at the client. The user "drags and drops" the application-specific data into the Inbox Control 110 of the website. Although in the preferred embodiment, data is imported into the website by dragging and dropping a file representation into the Inbox Control, other methods to import application-specific data onto a website are also possible, such as conventional browsing in a window.

Multiple sets of data, including different types of data from different applications, may be dropped into the "Inbox". The Inbox Control module 110 is the drop target of the website. It receives the dropped data, pre-processes the dropped data, and passes the document or documents to the Data Selector 120. In the preferred embodiment, HTML and Java Script in the page instantiate the Inbox Control and initialize it. Inbox Control 110 also receives the restrictions definitions, which are passed along with the data to the Data Selector.

When an application-specific data file is dragged and dropped into the "Inbox", an appropriate client component, capable of building an XML file for a specific dropped file type, is selected. The resulting XML file is packaged at the client and transferred to the server for processing as a hierarchy doc type. In addition to dragging and dropping an application-specific data file into the "Inbox", the system provides two other mechanisms for importing an XML file to be displayed at the server, a Project Translator and an application primary interface (API). The Project Translator is a server application that imports a new project through a server-side application. The API is a server COM object that imports either a project assembly or a new project. The API is a collection of commands that enables a user to obtain services from an application.

As shown at 320 in FIG. 2A, the Data Selector 120 determines which document handler to use to interpret both the data and the hierarchy of the data. The Data Selector 120 first checks to see which Data Clients are registered. The Data Selector 120 then sends the data, any restrictions, along with descriptives of the data, to each of the registered Data Clients 130, 140, 150 that are on that particular client. Each Data Client examines the dropped data and prepares a bid, indicating its ability to process the data. The Data Client bases its bid value on different criteria, including the file extension, the content of the file, the restrictions that were imposed, and other factors. The Data Client's bid indicates its ability to handle a given structured data file. The greater the Data Client's ability to handle the file, the higher the Data Client's bid will be.

All of the Data Clients then send their bids to the Data Selector 120. The Data Selector 120 controls the bidding and selects highest bidder, which signifies the best data handler. Restrictions are used in the bidding process to restrict certain types of data. Restrictions passed to the client can affect the bidding and restrict certain types of documents in certain places. Multiple documents can be dropped at the same time and different documents can be handled by different Data Clients.

While FIG. 1 shows three Data Clients 130, 140, 150, there may be any number of Data Clients on a particular client. The Data Clients are extendable data handlers. They bid for data that they recognize and once selected by the Data Selector 120, as shown at 330 on FIG. 2A, one of the Data Clients also processes the data into a source-independent format. Because there may be multiple Data Clients that process different types of data, the structured data publishing system of the present invention is very flexible and easily exendable. Selection of the Data Client processing the dropped document is based on bidding and can be easily extended. Components participating in the selection implement the same interface and can be added and registered with the system at any time. The architecture allows a new 'dataClient' to be easily created to a handle a new file type or the additional interpretation of an existing file type.

The Data Client is a document handler that, in the preferred embodiment, creates a specific, system-defined, version of XML called ApXML. XML is an extensible markup language, and in alternate embodiments other variations of XML could be used. The ApXML file describes the data structure of the file and also creates the supporting files. ApXML defines the structure on the client, as it applies to the meta-design model of the present invention, in a neutral format. The client sends the ApXML file to the server, where the ApXML data is interpreted and the corresponding data structure is created or updated. The ApXML file that is sent to the server is universally usable to create any kind of structure the meta-design of the present invention allows without regard to the original source of the data. ApXML is further described below and in Appendices A and B.

The client-side Data Client interprets, or processes, the application-specific structured data in the file that was dropped in the Inbox Control by interrogating the file in one of two ways. Using the first method of interrogating the file, the Data Client interprets the application-specific data file directly. According to the second method of interrogation, the Data Client opens the original creating application and interrogates it through the application's API to extract information about the file structure, graphic views, and other information. The Data Client also extracts any associated predefined information items associated with the original source data file, such as project element thumbnails, preview pictures or hotspots. It can also extract additional data such as additional project manager information or the like. The Data Client also implements a user interface to get specific information from the user, including options that affect the structure handling or graphical representations. The Data Client uses the information about the document structure to create an ApXML file that describes the data hierarchy and contains all of the related structured data. All of the files are placed in a designated directory structure.

The Data Client, after processing the application-specific data, returns a list of the files and all of the associated information back to the Data Selector 120. The additional information includes the Process Type, the Document Type and the Document Subtype. The Process type determines what Data Processor on the server will be used to process the structured data. The Data Selector 120 passes all the information back to the Inbox Control 110. The Data Client then passes the ApXML formatted data, which is a source-independent format, to Bundler Control 160. (The term "bundling" is used herein to denote a process of packaging files together in a single file or "bundle". Similar processes of combining data files for transfer over network are well-known in the art, and may be used in alternate embodiments.) The Bundler Control bundles all of the data that is necessary for transferring the structured data to the server into one file, as shown at 340 in FIG. 2A. The bundled data includes the ApXML, attached graphic files and information items. The bundled data is then transmitted to the server, as shown at 350 in FIG. 2A.

Referring again to FIG. 1 and to the flow chart in FIG. 2B, the server 200 interprets the ApXML file that is received and creates or updates from the ApXML file and the supporting files the structure of the website itself. The main components of the Server 200 are the Active Manager 210, any number of Data Processors 220, 230 and 240, an ApXML processor 250, and Bundler Control 260. When a data package is received at Server 200, shown at 360 in FIG. 2B, the Bundler Control 260 un-bundles the bundled files that were passed from the client, as shown at 370 in FIG. 2B.

The Active Manager 210 then determines which Data Processor should process the data, shown at 380 in FIG. 2B. The Active Manager 210 restores the content that was created by the Data Client on the client 100. Active Manager 210 then picks a Data Processor to interpret the data. The particular Data Processor is chosen according to the Process Type definition that was passed from the Data Client.

FIG. 1 shows Hierarchy Data Processor 220, Flat Hierarchy Data Processor 230, and Data Processor 240. In most cases of structured data publishing, either the Hierarchy Data Processor 220 or the Flat Hierarchy Data Processor 230 will be used, however other Data Processor modules may be implemented and used in the system. In the illustrated embodiment, the Hierarchy Data Processor creates a thumbnail image representative of the root level of the hierarchy, and processes down from the root level. In contrast, the Flat Hierarchy Data Processor skips the root level and begins processing and displaying at the first hierarchical level after the root level. The illustrated Hierarchy Data Processors thus process the same definition of a given structure, but create different visual representations, to suit user preferences. For example, the user of a Microsoft Project File may wish to have the first chapter of the data exposed when the data is initially displayed. In alternate embodiments, other implementations of Data Processors are possible.

While FIG. 1 shows three Data Processors 220, 230 and 240 on the server, any number of data processors may be in a particular implementation. The Data Processors are Component Object Model (COM) element based on the Microsoft model for defining and encapsulating objects and their interfaces. See www.microsoft.com/com/about.asp (incorporated herein by reference). The Data Processors control how the processed dropped data are applied to the website. Adding a new Data Client and/or a new handled data type does not necessarily require a new data processor to be added. One of the existing, standard processors can be used to interpret new data types. A new data processor is needed only in cases where the data or the hierarchy data need to be applied differently. For example, when some structure other than the standard website hierarchical data is to be created, a new data processor is obtained.

The data is passed to the Data Processor that was selected by the Active Manager 210, and the selected Data Processor makes the necessary preparations to process the ApXML data. The selected Data Processor calls the ApXML Processor 250 to create the structured part of the website from the object model defined by the ApXML data file and from the other files that were passed from the client. The Data Processor also sends the events that cause the website to be updated and regenerated, such as a signal from the user after completing a modification to the application-specific structured data. The ApXML Processor 250 is also a COM component. As shown at 390 on FIG. 2B, the ApXML Processor processes the ApXML data. The ApXML Processor 250 then determines which information structure corresponds to the received data, shown at 400 in FIG. 2B. The data received may be intended to update an existing data structure on the website, or it may be used create a new website structure. The ApXML Processor 250 creates or updates the data at the website, as shown at 410 in FIG. 2B, according to the instructions that were received from Data Processor 220, 230, 240.

ApXML

ApXML is the mechanism used by the structured data publishing system of the present invention to import any structured data regardless of the data's original source. ApXML is a specific definition of XML tags used to represent the system's complete internal meta-design structure. Appendix A shows the ApXML structure in more detail, as used in the present invention, and Appendix B is a list of the ApXML element tags according to the present invention.

The system uses a meta-design that represents the hierarchy and interdependencies of the structure defined by the "original" data. A significant feature of the invention is that while the ApXML files may not be passed directly to the website, they define a meta-design object model. The meta-design object model, in turn, defines the website structure and the events that modify the website. The meta-design object model itself is persistent, and, among other advantages, enables the provision of back-references and "reconstructability" of the object model. Further information regarding such meta-designs can be found in Framework Technologies Corporation's U.S. Pat. No. 5,664,180, the disclosure of which is incorporated herein by reference. Within the meta-design, each aspect can be decomposed into hierarchical project elements and sub-project elements. Each project element may have associated properties and other information items such as files, URLs, or database queries. The meta-design also describes the graphic look for each project element, which could be a thumbnail picture or a hotspot over a background picture. Each element in the meta-design has a corresponding tag in ApXML. For example, the tag 'FACE' is used to define a project element in a specific aspect. Other ApXML tags describe properties of each face of a project element. For example, ApXML uses the property tag 'LOOKGRAPHIC' to set the graphic representation for that face. It uses the property tag 'INFOITEM' to describe any associated information item files with that face. 'INFOITEM' itself has sub-properties that describe the specifics of the information item, such as its name, description, document type, and file path. ApXML is used to describe hierarchical information.

ApXML does not go directly to a website, but instead defines a meta-design object model. The system of the present invention then defines a website and generates the website events based on the meta-design object model. The meta-design object model is persistent, and allows back references to be created and maintained according the invention. ApXML defines the top-level aspects of a project or design by representing them as tabs in the system web sites. The project elements and sub-elements are also defined using ApXML tags. ApXML, according to the present invention, defines project element properties, such as the associated thumbnail picture, and predefined information item files, by associating them with that project element. ApXML defines a reference identifier to allow modifications to be made to an original data structure. When the original data file is modified and then republished, or re-displayed, with the modifications, the original object is recognized by the system using the reference identifier.

Referring to FIG. 3, a sample ApXML generated from a simple structured data application is shown.

The structured data publishing system of the present invention thus provides a user the ability to import any document or file that contains structured data onto a web site and have that structure automatically expanded into a matching structure on the site itself. The system maintains back references to objects in the original structure so that if the original, application-specific file is modified, the data that is associated with that object on the website is also appropriately modified.

When modifications are made to application-specific data, and then sent to the website to be published, the system recognizes the new place that the modified object exists and properly maps the data to it when the original file is republished with changes. The system detects changes in the structured data and causes the generation of automatic emails to notify particular users of the change.

The structured data publishing system of the present invention will now be further described in the following two examples, where the first example shows application-specific data that was produced using Microsoft Project processed according to the present invention, and the second example shows application-specific data that was produced using Visio. As will be detailed below, a user produces application-specific data, using one of various application systems, and then drags and drops the data into the Inbox Control of the system's webpage for web display at the server.

The system of the present invention determines whether a new website is to be created and published, or an existing website is to be modified and re-published. When an existing website is being modified, the system preserves any information it has throughout the modification. For example, if a user changes a particular PC on a Visio network diagram, the system preserves the association that the PC object has with any comments or information items associated with it even though the Visio diagram was edited and that PC is now in a different place in the diagram. A second example is a user modification of a particular schedule date of a task on a Microsoft project schedule. The system would recognize that the start or end date of the task has changed when the schedule was republished and would notify the subscribers to that task object by automatic e-mail generation and by publishing the revised schedule on the website. These examples will be further described below, although the system is not limited to these applications. It will be readily apparent to those skilled in the art that the structured data publishing system of the present invention can be implemented using any application-specific data.

EXAMPLE 1

Microsoft Project Data File Published on the ActiveProject Website

According to the present invention, an ActiveProject website is generated by the system using application-specific structured data from any of a variety of application programs. A new ActiveProject web site structure can be generated directly from Microsoft Project files, and many other types of data files, by extracting structured data from the application data files. A Microsoft Project file decomposes a project into any number of tasks and subtasks. In Microsoft Project, various information can be associated with each task. This information includes Resource names, task start and end dates, task completion status, and other data.

Figure 4:
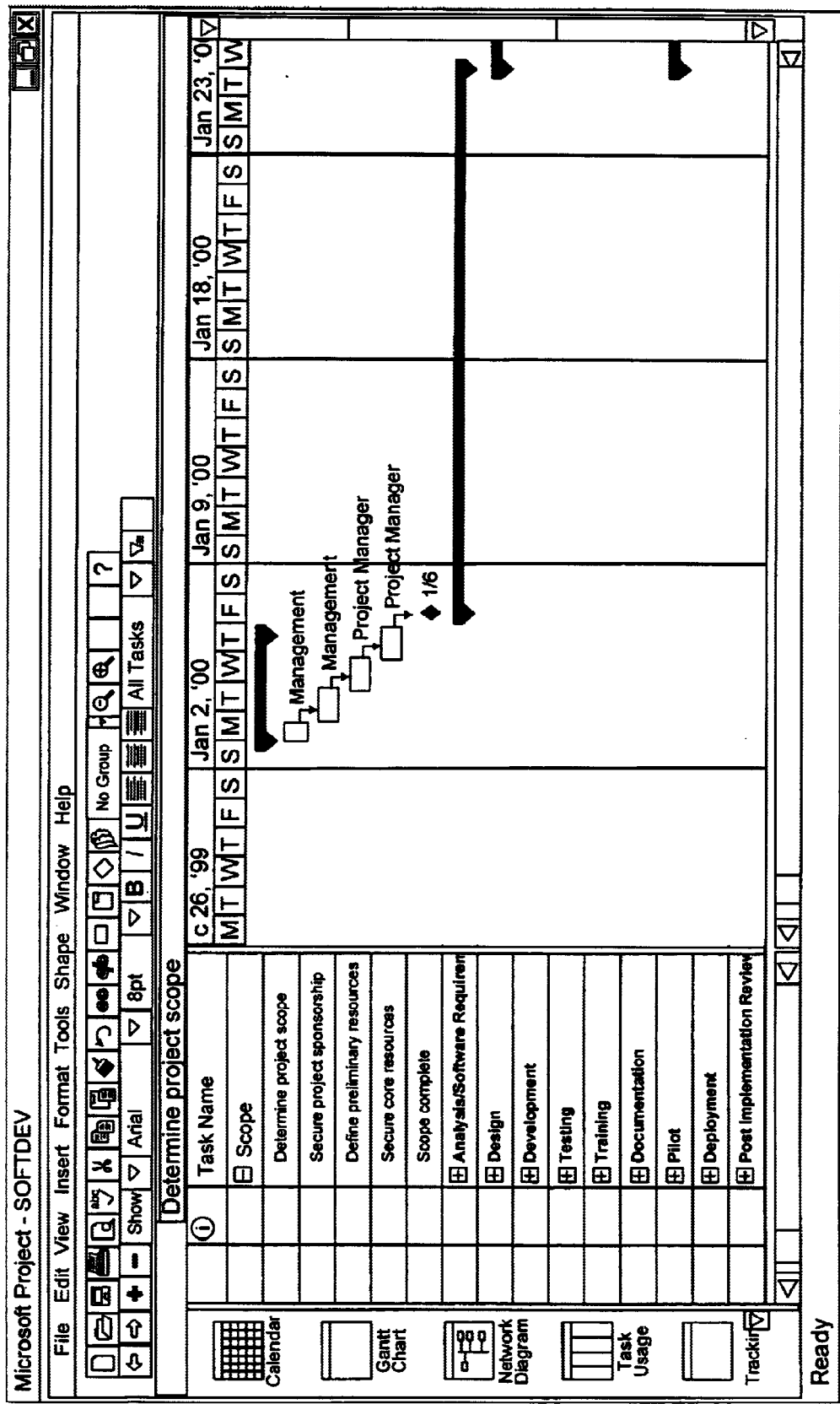
FIG. 4 is an example of data produced by the Microsoft Project software application.

FIG. 4 shows a screen display 450 of data generated using the Microsoft Project program for a sample project called SOFTDEV. On the left is a hierarchical breakdown of the project tasks shown in table form. In this case there are a number of top-level tasks ("Scope", "Analysis/Software Requirements", etc.). Under each task are one or more nested sub-tasks. In this example the "Scope" top-level task has the sub-tasks "Determine project scope", "Secure project sponsorship", etc. These subtasks themselves could be broken down further (in this example they are not). On the right hand side is a graphical depiction (Gantt chart) of the task hierarchy with certain user-defined labeling. Each bar in the Gantt chart is aligned with the comparable task in the table.

In this example, a user desires to create an ActiveProject Web Site, according to the present invention, with a structured publishing node using the data created by Microsoft Project. The structure inherent in the Microsoft Project schedule is extracted by software components in the Active-Project web site, and is used to generate a matching hierarchy of project elements with associated information items that hold the task information. The steps to perform this operation are listed below. A structured publishing node is a special type of project element that specifies to the underlying software components of the present invention that a new web site structure should be built when the user drops a file that contains recognized structured data.

Figure 5:
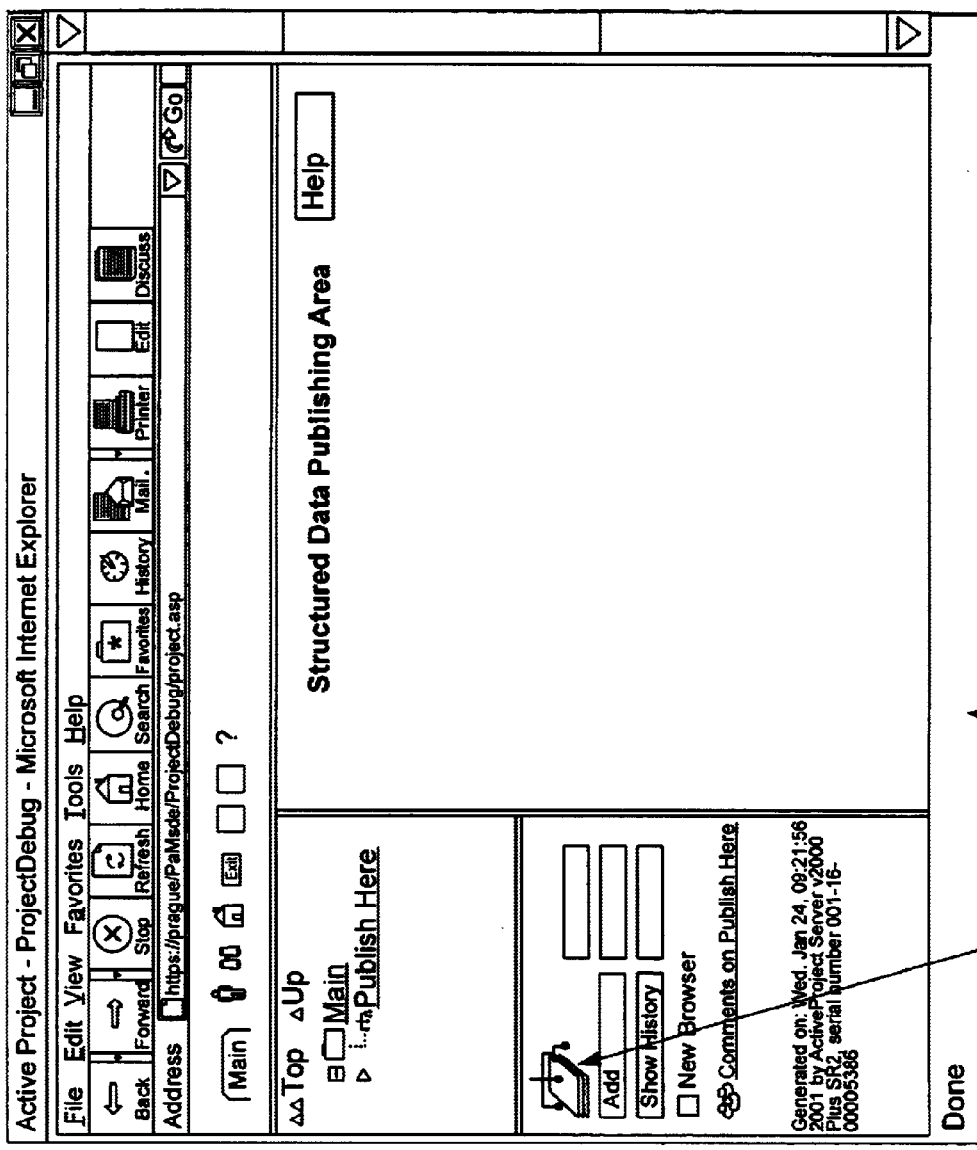
FIG. 5 shows the web browser of the present invention where the data produced by Microsoft Project shown in FIG. 4 is dragged and dropped into the Inbox Control of the webpage.

FIG. 5 shows the ActiveProject website display screen 550 of the present invention with a Structured Publishing Node. The user drag and drops the Microsoft Project file (*.mpp, *.mpt) shown in FIG. 4 on the Inbox icon 560 in the InfoItem frame. As shown in FIG. 5, the Inbox icon 560 is directly above the Add button in the frame on the bottom left of the web site, although in alternate embodiments, it could be located anywhere on the webpage.

Referring again to FIGS. 1, 2A and 2B, when a file is dropped on the Inbox 560, a number of steps occur to determine how to process the file. First the Inbox Control 110 receives the Microsoft Project data file and passes it to the DataSelector 120. The DataSelector 120 determines what DataClients 130, 140, 150, are available on the Client computer 100 and passes the Microsoft Project data file to each of these DataClients 130, 140, 150. Each DataClient 130, 140, 150, examines the Microsoft Project data file and determines if it can process that particular file type (*.mpp, *.mpt). Each DataClient 130, 140, 150 returns an acknowledgment to the DataSelector 120 in the form of a bid. The highest bidding DataClient is the one that is selected to process the file. In this case, where a Microsoft Project file was dropped on the Inbox of a Structured Publishing Node, the highest bidding DataClient will be the MsProjDataClient 140. This DataClient knows how to extract the task hierarchy and task information from a Microsoft Project schedule and to build an ApXML data file to describe this structure to the ActiveProject Server 200. As described above, new DataClients can be developed and added to support any file type.

Figure 6:
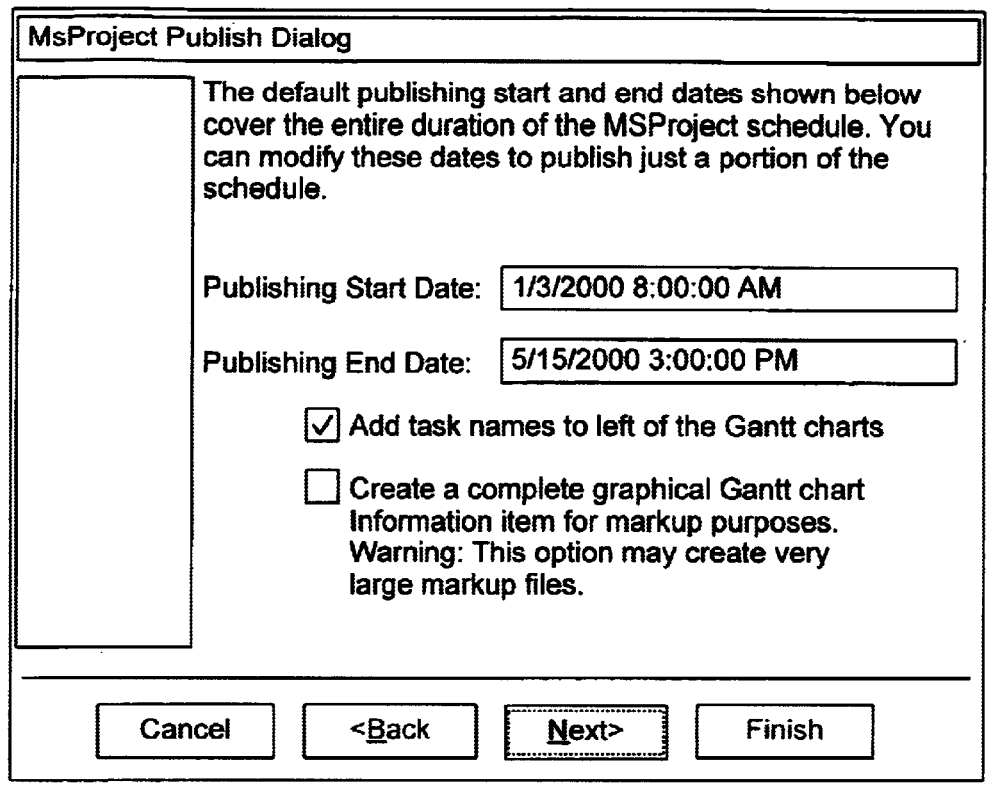
FIG. 6 shows a user-interface display screen, allowing the user to select various publishing options.

When the MsProjDataClient 140 is asked to process the Microsoft Project data file by the DataSelector 120, it displays a wizard-like interface so that the user can select various publishing options. The first page of the wizard is shown in FIG. 6. In the page shown in FIG. 6, the user configures the options that will determine the graphical look of the Gantt chart that will be shown in the graphics frame of the web site. After the graphical options are set in the first page, the user can select which additional information to associate with each project element. The additional information is information associated with a task in Microsoft Project. This information will be attached to the project elements in the ActiveProject data model using Information Item objects. These are special types of data model objects for attaching external information to a project element.

Figure 7:
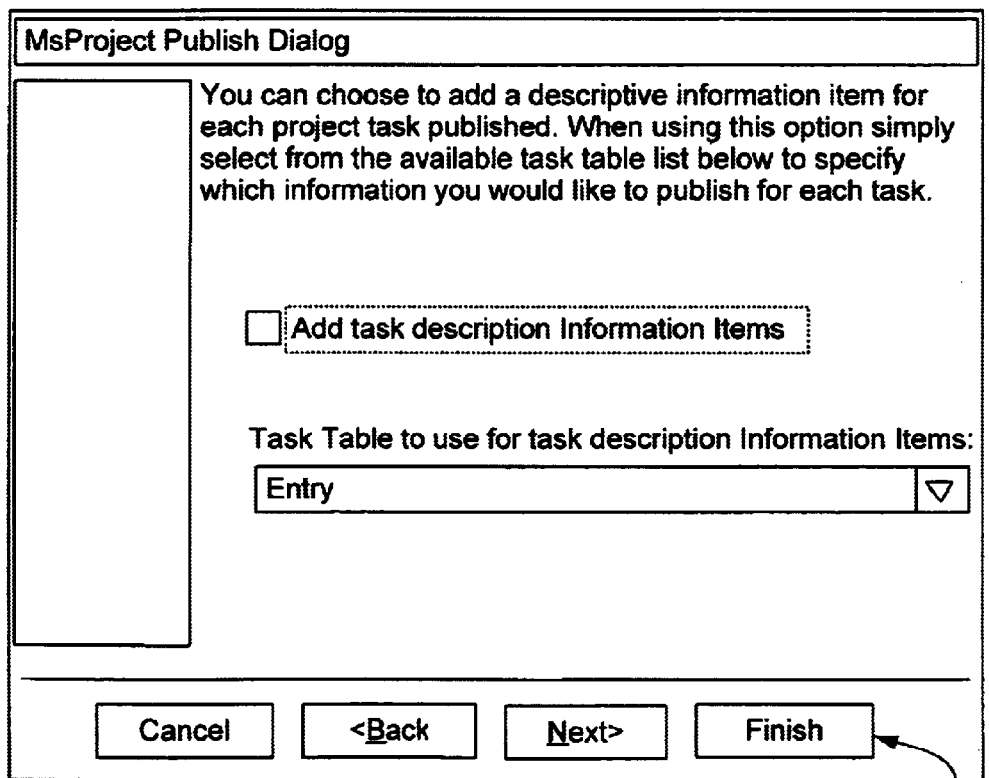
FIG. 7 is a user-interface display on which the user indicates that all of the configuration options have been set, and the user is ready to complete the data model construction and web site generation.

FIG. 7 shows a screen on which the user indicates that all of the configuration options have been set, and the user is ready to complete the data model construction and web site generation. When the user clicks on the "Finish" command 710, the MsProjDataClient 450 extracts all of the necessary information from Microsoft Project for the dropped data file. From this information, it generates an APXML data file that describes the project element hierarchy and all of the associated information items. Each project element corresponds to a task or sub-task in the original Microsoft Project data file. InfoItems are created to hold the additional information associated with each task. Each element in the ApXML that represents a task, sub-task or collection of information (InfoItem) from the original schedule is marked in such a way that an association is created between the ActiveProject data model object and the original schedule object that it represents. Therefore the data model objects "remember" where they came from. ApXML elements are marked with a unique identifier stored in a CustomProp tag. In the case of a task, the unique identifier is the value of the task id in the schedule. For InfoItems it is a unique key derived from the task id. If the same schedule file is modified and dropped on the Inbox 560 again, ActiveProject uses these tags to recognize what has changed and updates the web accordingly. This enables the system to make the appropriate changes to the website after the original publishing operation is modified and subsequently republished Once the MsProjDataClient 450 has completed the generation of the ApXML file and all associated InfoItem files, it passes the list of files back to the DataSelector 120, which passes it back to the Inbox Control 110. Inbox Control 110 uses Bundler Control 160 to bundle the files into a special type of zip file package. Client 100 then sends the bundled files over the Internet 300 (via the web site) to the ActiveProject server 300 of the present invention. On the server 300, the files are unpacked from the bundle by Bundler Control 260 and passed to ApXMLProcessor 250. The ApXMLProcessor 250 parses the ApXML data file and generates the corresponding information structure using the data model objects specified by the content of the ApXML data file. New web site content, which may be a modification of an existing website or a new website, is generated from the information structure data model objects. The new website content mirrors the original content of the Microsoft Project schedule that was stored in the Microsoft Project data file, and may be published, or displayed, to multiple users.

Figure 8:
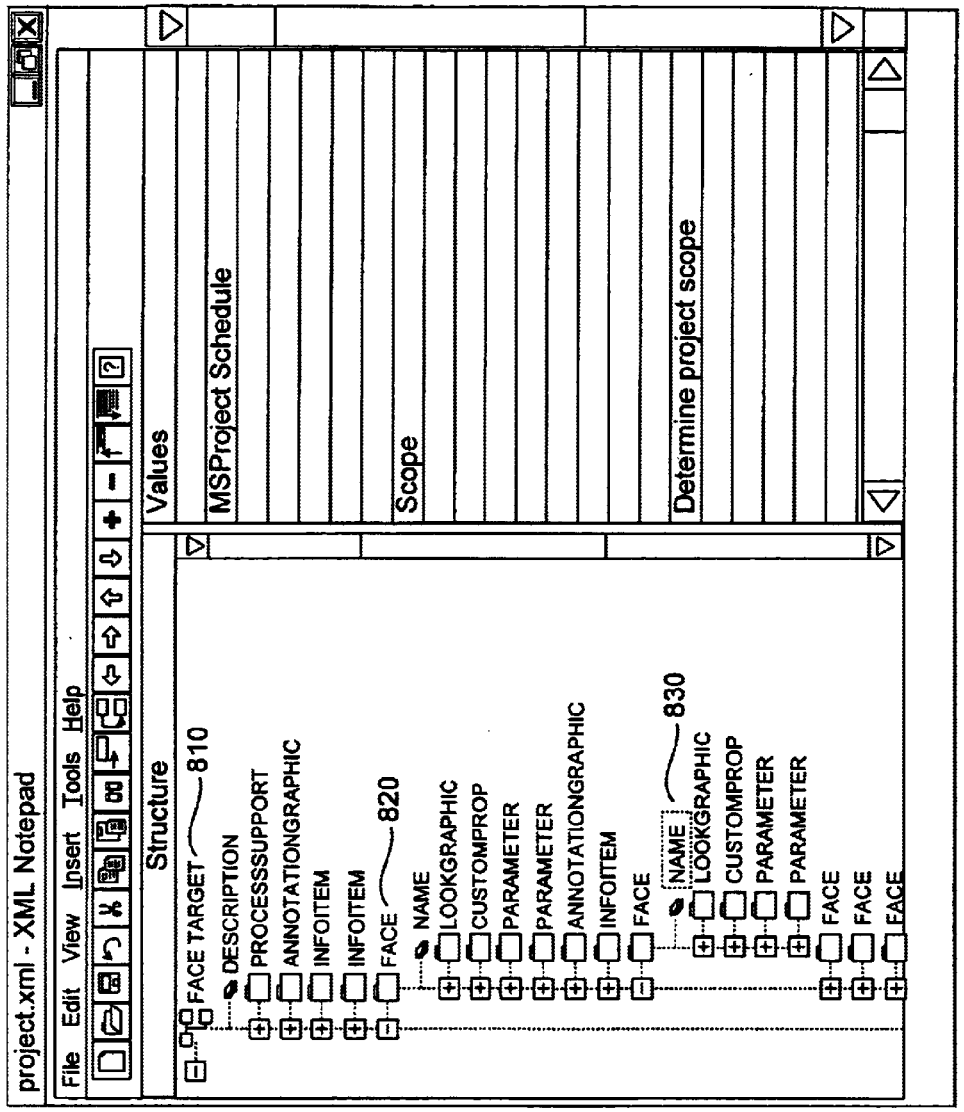
FIG. 8 is a partial listing of the ApXML data file that was generated from the Microsoft Project data of FIG. 4.

Referring to FIG. 8, a partial listing of the ApXML data file that was generated from the above Microsoft Project schedule is shown. (The file is shown using Microsoft's XML Notepad viewer). The FaceTarget XML node 810 is a placeholder to represent the project element in the web site where the structure should be built. Underneath the FaceTarget is a list of Face tags. Face tags are used to represent project elements that will be created in the data model hierarchy. There is a one-to-one correspondence between the Face tags in the ApXML data file and the tasks in the original schedule. The Face tags in the ApXML data file are nested in exactly the same way that the tasks are nested in the original schedule. The Face tags for the "Scope" task 820 and its sub-task "Determine project scope" 830 are shown in FIG. 8.

Figure 9:
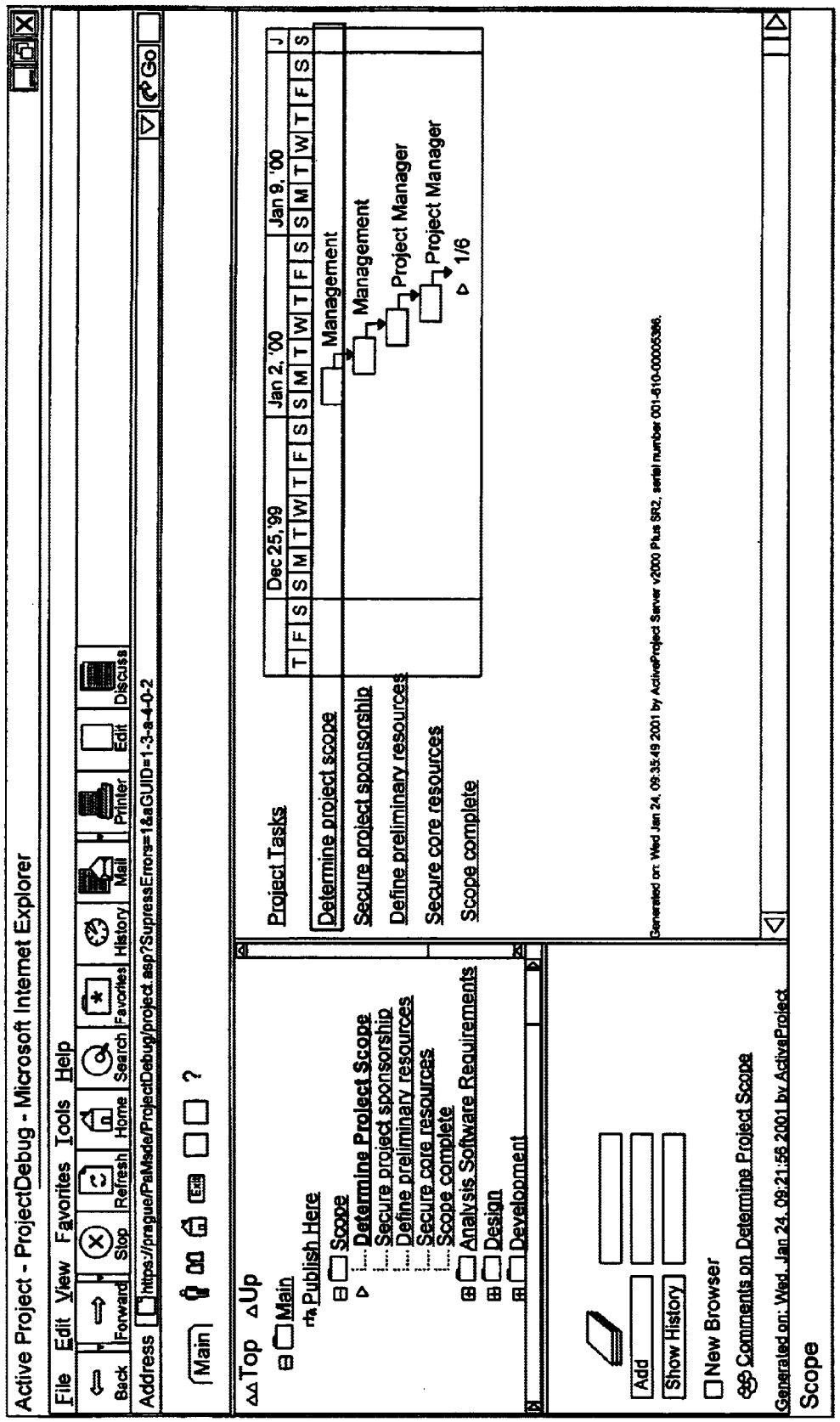
FIG. 9 shows the new web site content that was built from the project schedule according to the example shown in FIGS. 4–8.

FIG. 9 shows the new web site content that was built from the project schedule according to the example shown in FIGS. 4–8. The hierarchy of the project element shown in the outline frame corresponds exactly to the task hierarchy in the original schedule. The graphic in the graphics frame shows the comparable part of the original Gantt chart for the selected project element, or task. FIG. 9 shows, after the ApXML file has been processed, the web site page that is updated and regenerated on the ActiveProject website according to the present invention.

EXAMPLE 2

Visio Data File Published on the ActiveProject Website

According to the present invention, an ActiveProject web site structure can be generated from other types of data, such as from Visio drawings. In this implementation, the neutrally-formatted data is generated directly from the Visio drawings. A Visio drawing has a natural hierarchical decomposition based on Pages and Shapes. When a drawing is dropped on the ActiveProject Inbox, components in the web site determine what pages are present in the drawing, and what shapes are present in each page. Project elements are constructed based on this information. The steps to perform this operation are listed below.

Figure 10:
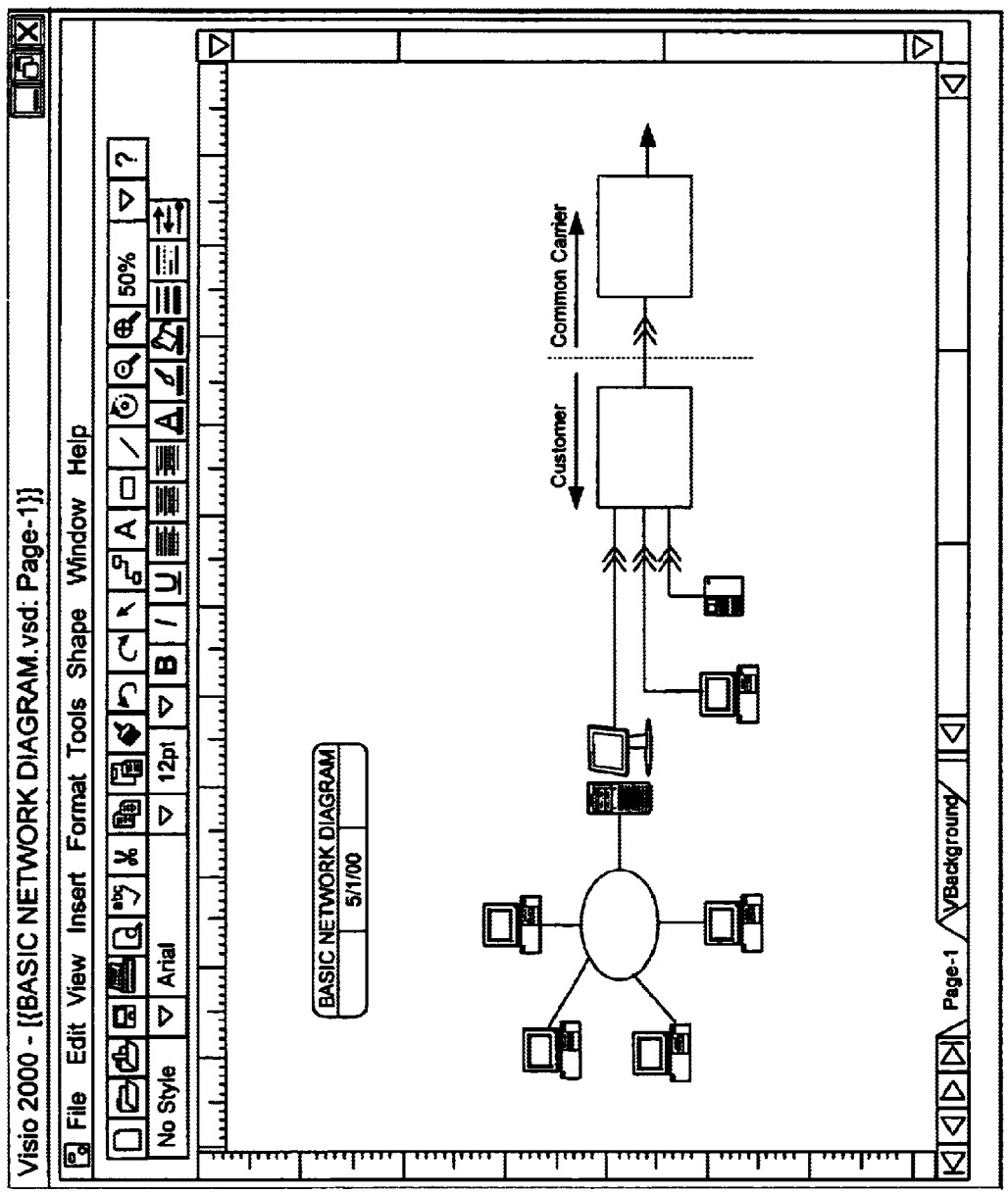
FIG. 10 shows a sample drawing produced by the Visio application program.

FIG. 10 shows a drawing called "Basic Network Diagram.vsd." The drawing shows a typical network layout with various computers connected on a local and wide area network. In this drawing there is only a single page, but each of the computers and network icons represents a unique Visio shape. A user creates the data shown in FIG. 10 and desires to have it published on the ActiveProject website according to the present invention.

Figure 11:
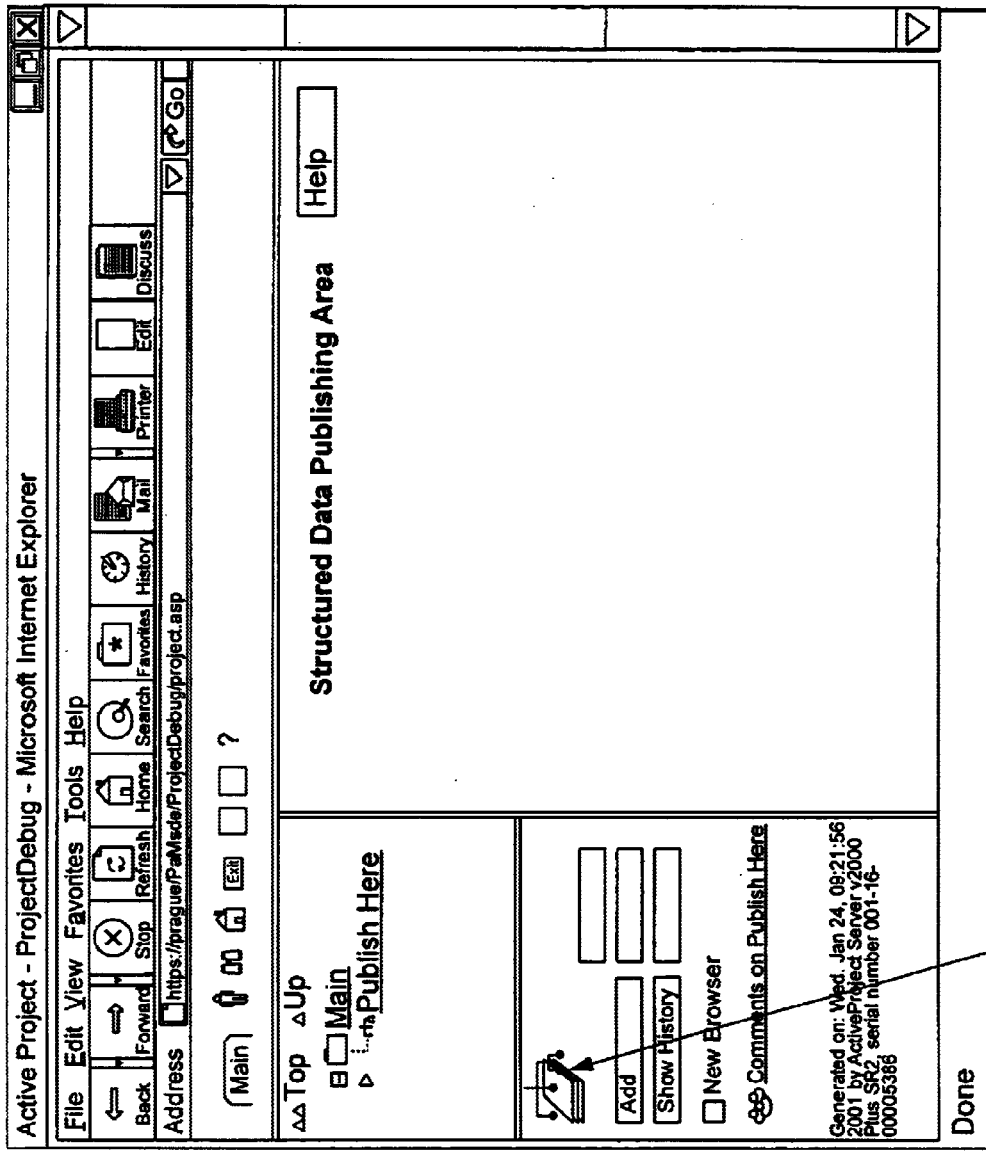
FIG. 11 is the website screen of the present invention where the user drags and drops the Visio drawing data file of FIG. 10 into the Inbox Control of the webpage.

As shown in FIG. 11, the website screen is identical to that shown in FIG. 4. However, in this example, the user drags and drops the Visio drawing file (*.vsd) shown in FIG. 10 on the Inbox icon 450 on the web site.

When a file is dropped on the Inbox 450, a number of steps occur to determine how to process the file. First the Inbox Control 110 receives the file and passes it to the DataSelector 120. The DataSelector 120 determines what DataClients 130, 140, 150 are available on the Client computer 100 and passes the file to each of these DataClients 130, 140, 150. Each DataClient 130, 140, 150 examines the file and determines if it can process that particular file type. It returns an acknowledgment to the DataSelector 120 in the form of a bid. The highest bidding DataClient is the one that is selected to process the file. In the case of a Visio drawing dropped on the Inbox of a Structured Publishing Node, the highest bidding DataClient will be the VisioDataClient. The VisioDataClient knows how to extract the Pages and Shapes from a Visio drawing and build an ApXML data file to describe this structure to the ActiveProject server 200.

Figure 12:
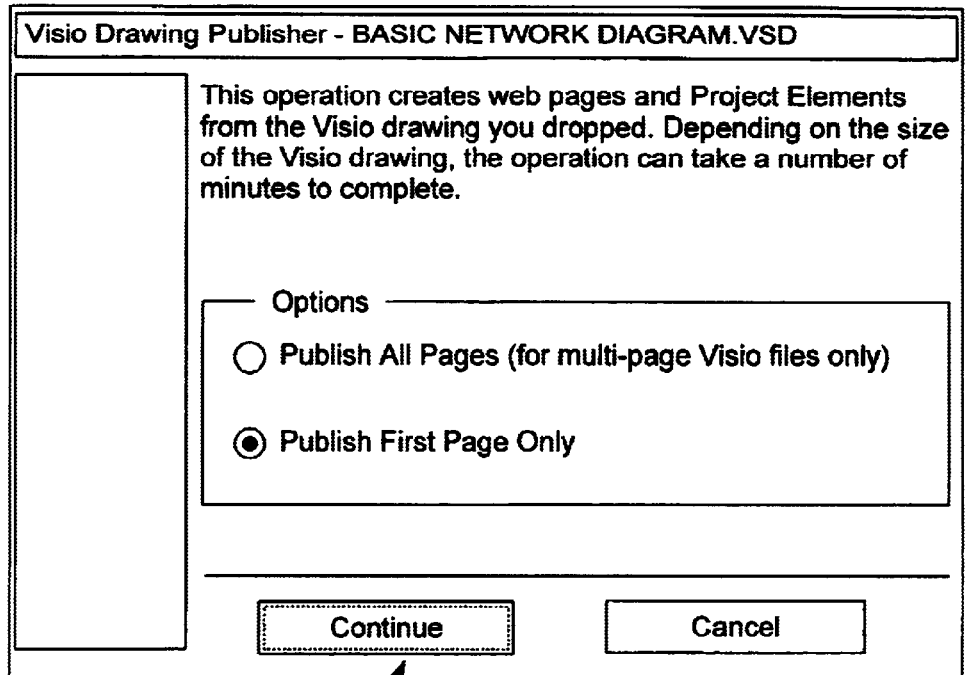
FIG. 12 is a dialog display screen allowing the user to select various publishing options.

Referring to FIG. 12, when the VisioDataClient is asked to process the file, it displays a series of dialog screens so that the user can select various publishing options. When processing a single page drawing, like the one in this example, the first dialog would look like that shown in FIG. 12. If the user was processing a multi-page visio drawing, the user would have the option to create web site content from all of the pages or only the first page. In this example there is only one page so the radio button in the dialog is disabled.

Figure 13:
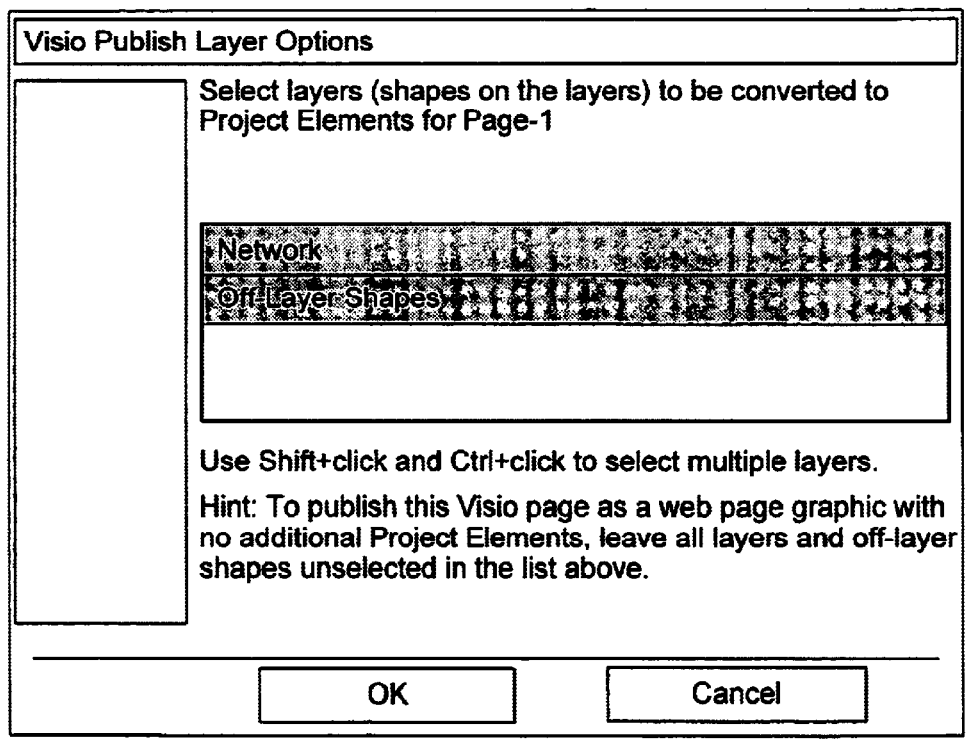
FIG. 13 is a second dialog display screen to indicate completion of entering options.

Referring to FIG. 13, when the user clicks Continue 600 on the first dialog, a second dialog, as shown in FIG. 13, appears that allows the user to select which shapes to convert to project elements. The shapes to convert are determined by which layer they are on. The user would select one or more layers and all of the shapes on the selected layers would be converted. Typically, Visio drawings are organized into layers. Similar types of objects (shapes) are stored on their own layer. In this example all of the shapes that represent network elements are stored on the Network layer. Other shapes are stored on the background (Off-Layer shapes). When all of the configuration options have been set, the user clicks the OK button to allow the software to complete the data model construction and web site generation.

At this point the VisioDataClient will extract all of the necessary information from Visio for the dropped file. From this information it will generate ApXML data file that describes the project element hierarchy. The top-most project element will represent the drawing itself. The project elements under this will either represent all of the shapes on the layers selected to be converted, or it will represent each page in a multi-page drawing. Each element in the ApXML data file that represents a page or shape from the original drawing is marked in such a way that an association is created between the ActiveProject data model object and the original visio object that it represents. Therefore the data model objects "remember" where they came from. ApXML elements are marked with a unique identifier stored in a CustomProp tag. In the case of a page it is the page number, in the case of a shape it is the shape id. If the same Visio drawing file is modified and dropped on the Inbox again, ActiveProject uses these tags to recognize what has changed and update the web site accordingly. The system thus ensures that all changes made to the web site after the original publishing operation are maintained properly on subsequent republishes.

Once the DataClient has completed the generation of the ApXML file, it passes the original file and the ApXML file back to the DataSelector 120, which passes them back to the Inbox Control 110. The Inbox Control 110, using Bundler Control 160, bundles the files into a special type of zip file package and sends them over the Internet 300 (via the web site) to the ActiveProject Server 200. On Server 200, the files are unpacked from the bundle using Bundler Control 260 and passed to the ApXMLProcessor 250. The ApXMLProcessor 250 parses the ApXMLdata file and generates the information structure data model objects specified by the content of the ApXML. From these information structure data model objects, new web site content is generated that mirrors the original content of the Visio drawing shown in FIG. 10.

Figure 14:
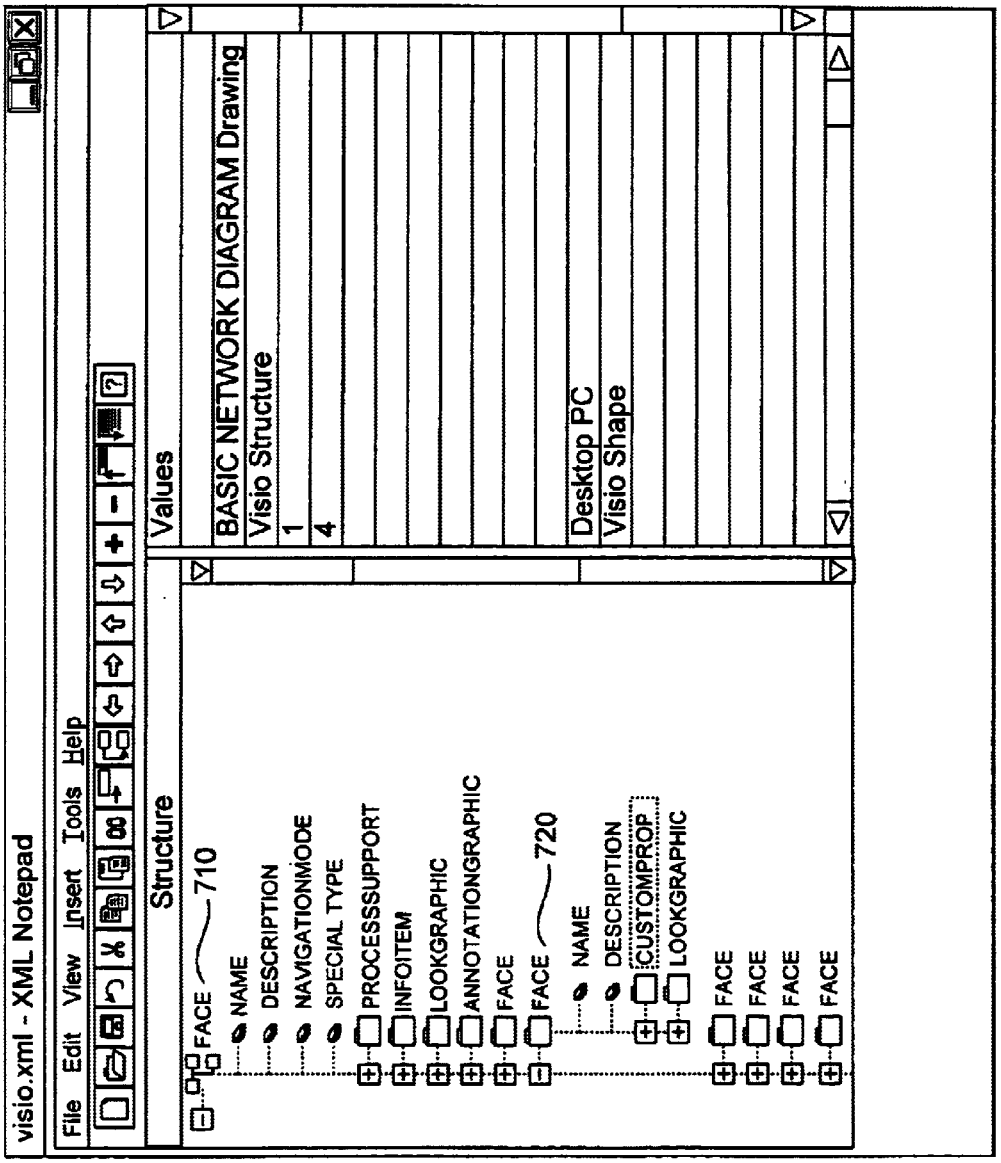
FIG. 14 shows a partial listing of the ApXML generated from the Visio drawing shown in FIG. 10.

FIG. 14 shows a partial listing of the ApXML generated from the Visio drawing shown in FIG. 10. The Face XML 710 node at the top of the page is used to create the project element that represents the entire drawing itself. Face tags are used to represent project elements that will be created in the data model hierarchy. Underneath the top level Face tag is a list of child Face tags. There is a one-to-one correspondence between the Face tags in the ApXML and the shapes on the layers that were selected to be converted to project elements. Face tag 720 shows the face tag for the "Desktop PC" shape.

Figure 15:
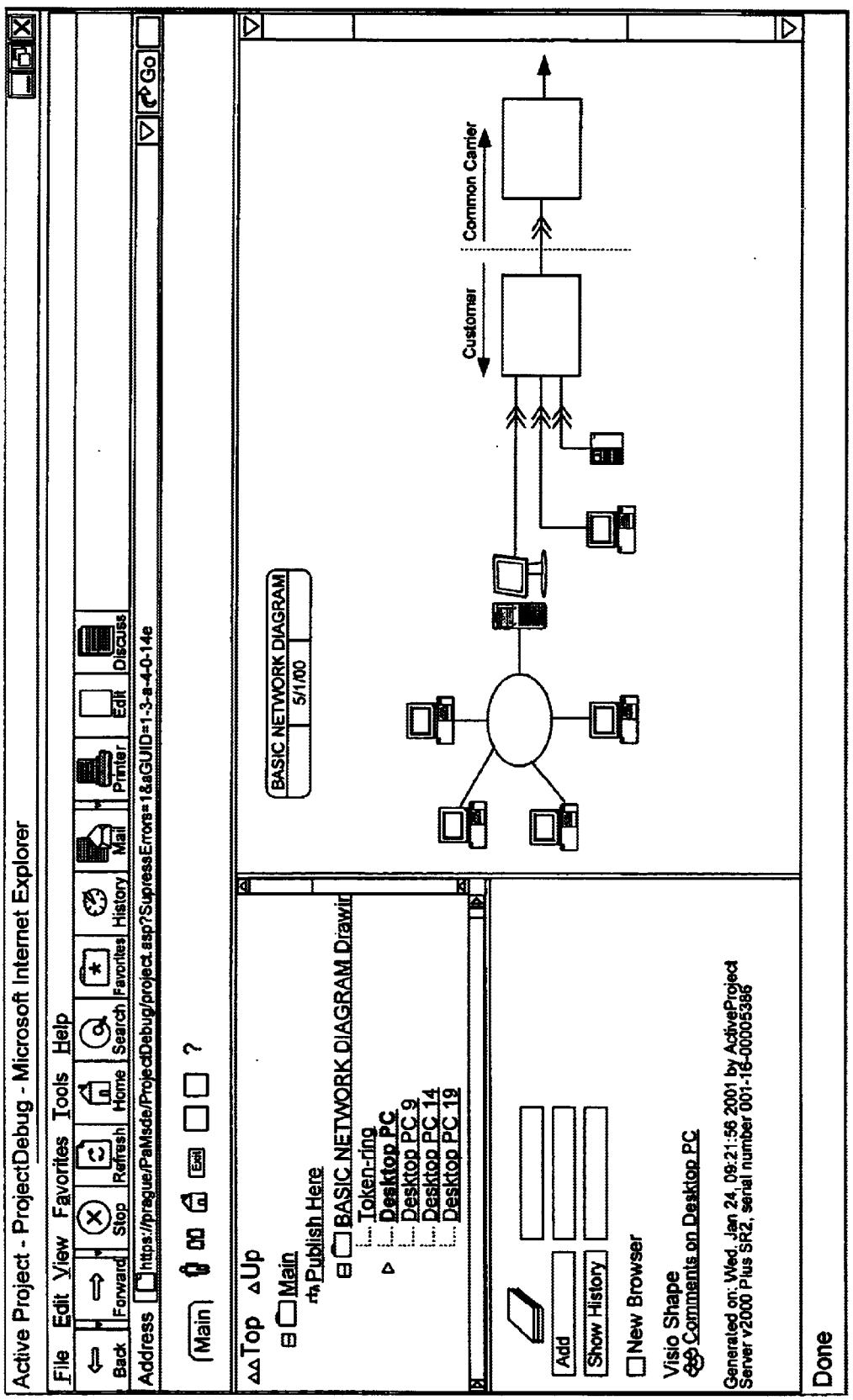
FIG. 15 shows the new web site content that was built from the Visio drawing of FIG. 10.

After the ApXML file is processed, the web site pages that need to be updated are regenerated. FIG. 15 shows the new web site content built from the Visio drawing of FIG. 10. The hierarchy of project elements shown in the outline frame corresponds to the drawing itself, and the shapes on the selected layers. The graphic in the graphics frame shows the Visio drawing with the project element that corresponds to the "Desktop PC" shape selected.

What is claimed is:

1. A method of transferring application-generated structured data from a client to a server, such that information structures specified by the application-generated structured data can be automatically expanded into corresponding information structures displayable by a website in communication with the server, the method including the steps of:

providing an interface at the client for accepting application-generated structured data, converting into a source-independent format the accepted application-generated structured data, thereby to generate a source-independent data package, wherein the converting step includes interpreting the application-generated structured data and creating a definition of a meta-design object model of the application-generated structured data; and packaging all relevant data, including the meta-design object-model and graphics files or other information items, into the source-independent data package, transmitting to the server the source-independent data package, receiving at the server the source-independent data package, and creating or modifying on the server, in accordance with the received source-independent data package, information structures corresponding to the information structures specified by the application-generated structured data, wherein the information structures created or modified on the server include back references to the information structures specified by the application-generated structured data so that if the original, application-generated structured data is modified, the information structures at the server, corresponding to the information structures specified by the application-generated structured data, are also appropriately modified.

2. The method of claim 1 wherein the application-generated structured data contains embedded information providing description about organization, hierarchical decomposition or source of the data.

3. The method of claim 2 wherein the application-generated structured data is CAD data.

4. The method of claim 3 wherein the application-generated structured data contains embedded information providing description about organization of a three-dimensional design into assemblies, sub-assemblies and parts.

5. The method of claim 4 wherein the CAD data is created by a CAD software tool.

6. The method of claim 5 wherein the CAD software tool is Solidworks or ProEngineer.

7. The method of claim 2 wherein the application-generated structured data is representative of a project schedule.

8. The method of claim 7 wherein the application-generated structured data is produced by Microsoft Project.

9. The method of claim 8 wherein the application-generated structured data includes information about tasks and sub-tasks of the schedule.

10. The method of claim 2 wherein the application-generated structured data is produced by Microsoft PowerPoint.

11. The method of claim 2 wherein the application-generated structured data is produced by Microsoft Excel.

12. The method of claim 1 wherein the client runs a process to determine which of a plurality of document handlers is to be used to process the application-generated structured data.

13. The method of claim 1 wherein the meta-design object-model is an ApXML file representative of the application-generated structured data.

14. The method of claim 13 wherein the interpreting step is executed by the client, which runs a document handler that interprets the application-generated structured data in the designated file directly or by opening the creating application and interrogating the creating application through an API to obtain the application-generated structured data.

15. The method of claim 14 wherein the meta-design object model is an ApXML file.

16. The method of claim 15 wherein the server, following receipt of the package, interprets the ApXML and in response to the interpretation of the ApXML and supporting files, creates or modifies information structures on the website in accordance with information contained in the ApXML and supporting files.

17. The method of claim 16 wherein the client contains an Inbox Control comprising an ActiveX control that functions as a "drop" target in a GUI image presented by the website.

18. The method of claim 1 wherein the client contains an Inbox Control comprising an ActiveX control that functions as a "drop" target in a Graphical User Interface image presented by the website, and the Inbox Control functions to accept the "dropped" data.

19. The method of claim 18 wherein the client contains a Data Selector that controls bidding and selection of an appropriate data handler.

20. The method of claim 19 wherein the Data Selector employs restrictions in the bidding process to restrict selected types of data.

21. The method o!claim 20 wherein the client contains at least one Data Client that functions as a data handler.

22. The method of claim 18 wherein the client contains a plurality of Data Clients that (1) collectively constitute an extendible set of data handlers, (2) bid for the handling of data types they recognize, (3) can be selected by the Data Selector, and (4) once selected by the Data Selector, process the data.

23. The method of claim 22 wherein new Data Clients can be added and registered with the system and bidding process, whereby the set of Data Clients is extended.

24. The method of claim 23 wherein the client contains a Bundler Control that bundles into discrete files any data designated for transfer to the saver.

25. The method of claim 24 wherein the Server contains an Active Manager that unbundles data received from the client.

26. The method of claim 25 wherein the server contains a Data Processor that controls the manner in which "dropped" data are applied to the website in accordance with information contained in the data.

27. The method of claim 26 wherein the server contains a plurality of Data Processors and the Active Manager selects an appropriate Data Processor from among the plurality of Data Processors to process the received data.

28. The method of claim 27 wherein the server contains an ApXML processor that processes the received XML data and creates website structure according to instructions from the selected Data Processor.

29. The method of claim 28 wherein the server contains a Bundler Control that is employed to un-bundle the bundled files received from the client.

30. The method of claim 29 further comprising the following steps:

navigating, using a web browser on the client, to a web page providing an interface to the Inbox Control, dragging and dropping, on a GUI supported by the web browser, at least one document containing application-generated structured data onto the display area associated with the Inbox Control, passing the application-generated structured data to the Data Selector, determining, using the Data Selector, the identities of registered Data Clients, passing the application-generated structured data to the registered Data Clients, receiving bids from the Data Clients, responsive to each Data Client's examination of the structured data, evaluating, based upon predetermined criteria, the bids received from the Data Clients, selecting, responsive to the evaluating step, a Data Client to process the application-generated structured data, processing, using the selected Data Client, the application-generated structured data, and creating or modifying, on the server, information structures specified by the application-generated structured data, thereby to create or modify structure on the website.

31. The method of claim 30 wherein the processing step includes the step of interrogating the file and extracting therefrom information descriptive of structure, graphic view and any associated predefined information items extracted from the original source data file, project element thumbnail images, preview images or hotspots.

32. The method of claim 31 wherein the interrogating step includes either interpreting the file data directly or calling the file's creating application and using an API associated with the application.

33. The method of claim 32 wherein the processing step includes the further step of activating a user interface to obtain information from the user.

34. The method of claim 33 wherein the information can include options affecting structure handling or geographical representations.

35. The method of claim 34 wherein the processing step further includes using information about the document structure to create an ApXML, tile describing hierarchy and related application-generated structured data, wherein the ApXML file is the meta-design object model of the application-generated structure data.

36. The method of claim 35 wherein the processing step further includes placing in a designated directory structure all corresponding files.

37. The method of claim 36 comprising the further step of returning, using the Data Client, a list of files and associated information back to the Data Selector.

38. The method of claim 37 wherein associated information includes Process Type, Document Type and Document Subtype.

39. The method of claim 38 comprising the further step of passing, using the Data Selector, all associated information back to the Inbox Control.

40. The method of claim 39 comprising the further step of utilizing the ApXML Processor to create or modify information structures specified by the application-generated structured data, in response to the ApXML and other ales received from the client.

41. The method of claim 40 comprising the further step of transmitting to a website in communication with the server, events that cause the website to be updated and regenerated in correspondence with the application-generated structured data generated at the client.

42. The method of claim 41 wherein data processing restrictions can be assigned to the application-generated structured data at the Inbox Control.

43. The method of claim 42 wherein bids are based upon predetermined criteria.

44. The method of claim 43 wherein the criteria can include file extension, file content or restrictions.

45. The method of claim 44 wherein bids are generated in accordance with a Data Client's evaluation of its ability to handle a given file of application-generated structured data.

46. The method of claim 45 wherein the greater the Data Client's ability to handle the file of application-generated structured data, the higher the Data Client's bid.

47. The method of claim 46 wherein the file of application-generated structured data is passed to the highest bidder.

48. The method of claim 47 wherein the Inbox Control is instantiated and initialized using HTML and Java Script in the web page containing the interface to the Inbox Control.

49. The method of claim 48 wherein ApXML functions as a mechanism to import any application-generated structured data in a manner independent of the source of that application-generated structured data.

50. The method of claim 49 wherein ApXML is a specific definition of XML tags used to represent an ActiveProject internal meta-design structure.

51. The method of claim 50 wherein the ActiveProject meta-design describes aspects of a design, including categories of information, the hierarchical decomposition of each aspect into project elements and sub-project elements, and any properties and associated information items associated with each project element.

52. The method of claim 51 wherein the properties and information items associated with each project element can include files, URLs, and database queries.

53. The method of claim 52 wherein the meta-design also describes a graphic appearance for each project element.

54. The method of claim 53 wherein the graphic appearance can include a thumbnail image or a hotspot over a background picture.

55. The method of claim 54 wherein each element in the meta-design has a corresponding tag in ApXML.

56. The method of claim 55 wherein a tag in ApXML is used to designate any information items or files associated with an aspect of a project.

57. The method of claim 56 wherein information items can include name, description, document type and file path.

58. The method of claim 57 wherein ApXML supports definitions of top level aspects of a project or design.

59. The method of claim 58 wherein top level aspects of the project or design are represented as tabs in the associated web sites.

60. The method of claim 59 wherein ApXML supports definition of project elements and sub-elements using XML tags.

61. The method of claim 60 wherein ApXML supports definition of project element properties, including associated thumbnail images, and association of predefined information item files with the defined project element.

62. The method of claim 61 wherein ApXML supports definition of a reference identifier so that when the original data files are republished, the same object can be recognized.

63. The method of claim 1 comprising the further step of maintaining back references from the structured data at the server to the corresponding application-specific structured data at the client.

64. A method for replicating, on a website in communication with a server, representations of application-specific structured data originating on a client, the method comprising the steps of:
  obtaining application-specific structured data at the client, where the application-specific structured data can be generated by any of a number of application programs;
  converting the application-specific structured data into an application-independent format to create an application-independent data bundle, wherein the converting step includes
    interpreting the application-specific structured data and creating a definition of a meta-design object model of the application-specific structured data; and
    packaging all relevant data, including the meta-design object-model and graphics files or other information items, into an application-independent data bundle,
  sending the application-independent data bundle over the communications network to the server;
  expanding the application-independent data bundle into structured data at the server, the structured data at the server specifying representations corresponding to the application-specific structured data that originated on the client, wherein the application-independent format include, back references to the application-specific structured data so that if the original, application-specific structured data is modified, the data that is associated with the corresponding structured data at the server is also appropriately modified; and
  generating events to modify the web site in communication with the server to create the specified representations.

65. The method of claim 64 wherein the application-independent format utilizing an extensible markup language.

66. The method of claim 64 wherein the step of generating events to modify the web site includes processing the received application-independent data bundle and, based thereon, modifying structured data already on the server no specify representations corresponding to modified application-specific structured data that originated on the client.

67. A method for replicating, on a website in communication with a server, representations of application-specific structured data originating on a client, the method comprising the steps of:
   activating an Internet connection between the client and the server,
   activating a browser program at the client, the browser program including a GUI;
   sending to the client via the Internet a hypertext document containing information representative of a drop zone displayable on the GUI, for receiving, via a GUI drag-and-drop operation, a file;
   receiving, via the drop zone, an application-specific file containing a data object characteristic of an application program used to create the application-specific file;
   converting the application-specific file into application-independent data, wherein
      the converting step includes
         interpreting the application-specific file and creating a definition of a meta-design object model of the application-specific file; and
         packaging all relevant data, including the meta-design object-model and graphics files or other information items, into a bundle of application-independent data;
   sending the bundle of application-independent data over a connection to the server;
   expanding the application-independent data into structured data at the server the structured data at the server specifying an information structure corresponding to information structures specified by the application-specific file; and
   generating an event, based on the structured data at the server, to modify the web site in communication with the server to create the specified information structure, wherein the structured data at the server includes back references to the application-specific file so that if the original, application-specific file is modified, the data that is associated with the corresponding information structures at the server is also appropriately modified.

68. The method of claim 67 wherein a plurality of application-specific files are received via the drop zone.

69. The method of claim 67 wherein the application-specific files at the client can be generated by any of a plurality application programs.

70. The method of claim 69 further including the step of maintaining the back references from the structured data at the server to the corresponding application-specific file at the client.

71. The method of claim 67 wherein the website has a set of associated users, who are notified when the website is modified.

72. The method of claim 71 wherein the users are notified by e-mail.

73. A method for replicating, on a website in communication with a server, representations of application-specific structured data originating on a client, the method comprising the steps of:
   obtaining application-specific structured data at the client;
   passing the application-specific structured data to two or more bidding data processor elements;
   causing each of the bidding processors to interpret the application-specific structured data;
   causing each of the bidding processors to generate a bid representative of the ability of the submitting processor to convert the application-specific structured data into application-independent data;
   selecting, on the basis of the generated bids, one of the bidding processors to convert the application-specific structured data;
   causing the selected bidding component to convert the application-specific structured data into application-independent data, wherein
      converting the application-specific structured data includes
         interpreting the application-specific structured data and creating a definition of a meta-design object model of the application-specific structured data; and
   packaging all relevant data, including the meta-design object-model and graphics files or other information items, into a bundle of application-independent data
   sending the application-independent data bundle over a connection to the server;
   expanding the application-independent data into structured data at the server, the structured data at the server specifying representations corresponding to the application-specific structured data originating on the client; and
   generating an event, based on the structured data at the server, to modify the web site in communication with the server to create the specified information structure, wherein the application-independent data includes back references to the format of the application-specific structured data so that if the original application-specific structured data is modified, the data that is associated with the corresponding information structures at the server is also appropriately modified.

74. The method of claim 73 including the further step of determining which bidding processors arc registered on the client.

75. The method of claim 74 including the further steps of determining whether restrictions are associated with the application-specific structured data; and passing, to the bidding components, the restrictions with the application-specific structured data.

76. The method of claim 75, wherein the bid value is based on any of file extension, file content, or restrictions.

77. The method of claim 76, wherein the application-independent data is structured in accordance with an extensible markup language.

78. The method of claim 77 wherein the markup language comprises XML.

79. The method of claim 78 including the further steps of:
   extracting structure information from the application-specific data; and
   sending to the server the structure information along with the application-independent data.

80. The method of claim 78 further including:
   obtaining structure information from a human user at the client;
   sending to the server the structure information along with the application-independent data.

81. The method of claim 80 comprising the further steps of:
   requesting, by generating a request signal at the client, a new data processor element if none of the existing data processor elements is capable of converting the application-specific structured data into application-independent data; and
   registering the new processor element at the client.

82. The method of claim 81 comprising the further step of utilizing the new processor element to convert the application-specific data into application-independent data.

83. A method of transferring application-generated structured data from a client to a server, such that information structures specified by the application-generated structured data can be automatically expanded into corresponding information structures displayable by a website in communication with the server, the client having a set of Data Clients, the method including the steps of:
   providing an interface at the client for accepting application-generated structured data,
   selecting a Data Client to process the application-generated structured data;
   converting the accepted application-generated structured data, by the selected Data Client, into a source-independent format, thereby to generate a source dependent data package, wherein
      the converting step includes
         interpreting the application-generated structured data and creating a definition of a meta-design object model of the application-generated structured data; and
         packaging all relevant data, including the meta-design object-model and graphics files or other information items, into a source-independent data package,
   transmitting to the server the source-independent data package,
   receiving at the server the source-independent data package, and
   creating or modifying on the server, in accordance with the received source-independent data package, information structures corresponding to the information structures specified by the application-generated structured data, wherein the source-independent data package includes back references to the format of the application-generated structured data so that if the original, application-generated structure data is modified, the data that is associated with the corresponding information structures at the server is also appropriately modified.

84. The method of claim 83 wherein new Data Clients can be added and registered with the system, whereby the set of Data Clients is extended.

85. The method of claim 84 wherein the client interface accepts a plurality of application-generated structured data sets.

86. The method of claim 85 wherein the plurality of application-generated structured data sets may be generated by a plurality of applications.

87. The method of claim 85 wherein a plurality of Data Clients are selected to convert application-specific structured data, each Data Client being assigned one or more application-specific structured data sets.

88. The method of claim 83 comprising the further step of generating a thumbnail image representative of at least a portion of the information structure.

89. The method of claim 88 comprising the further step of generating a thumbnail image representative of a data object.

90. A system for transferring application-generated structured data from a client to a server, such that information structures specified by the application-generated structured data can be automatically expanded into corresponding information structures displayable by a website in communication with the server, the system including:
   an interface at the client for accepting application-generated structured data,
   a converter element that converts into a source-independent format the accepted application-generated structured data, thereby to generate a source-independent data package, wherein
      the converting step includes
         interpreting the application-generated structured data and creating a definition of a meta-design object model of the application-generated structure data; and
         packaging all relevant data, including the meta-design object-model and graphics files or other information items, into the source-independent data package,
   a communications channel that transmits to the server the source-independent data package,
   elements at the server that receive the source-independent data package, and
   elements that create or modify on the server, in accordance with the received source-independent data package, information structures corresponding to the information structures specified by the application-generated structured data, wherein the source-independent data package includes back reference, to the format of the application-generated structured data so that if the original application-generated structure data is modified, the data that is associated with the corresponding information structures at the server is also appropriately modified.

91. The method of claim 1, wherein the step of creating or modifying the information structures includes:
   processing the received source information package and information structures already created or modified on the server and, based thereon, modifying the information structures already on the server.

92. The method of claim 83, wherein creating or modifying the information structures includes:
   processing the received source information package and information structures already created or modified on the server and, based thereon, modifying the information structures already on the server.

93. The method of claim 90, wherein the element, that create or modify the information structures includes:
   elements that process the received source information package mud information structures already created or modified on the server and, based thereon, modify the information structures already on the server.

94. A method of transferring application-generated structured data from a client to a server, such that information structures specified by the application-generated structured data can be automatically expanded into corresponding information structures displayable by a website in communication with the server, the method including the steps of:
   providing an interface at the client for accepting application-generated structured data,
   converting into a source-independent format the accepted application-generated structured data, thereby to generate a source-independent data package, wherein the converting step includes
- definition of a meta-design object model of the application-generated structured data; and
- packaging all relevant data, including the meta-design object-model and graphics files or other information items, into the source-independent data package, transmitting to the server the source-independent data package, receiving at the server the source-independent data package, and creating or modifying on the server, in accordance with the received source-independent data package, information structures corresponding to the information structures specified by the application-generated structured data, wherein the information structures at the server include back references to the format of the application-generated structured data so that if the original, application-generated structure data is modified, the data that is associated with the corresponding information structures at the server is also appropriately modified wherein the client contains a control that functions as a "drop" target in a Graphical User Interface image presented by the website, and the control functions to accept the "dropped" data.

* * * * *